US010382129B2

(12) United States Patent
Jovicic et al.

(10) Patent No.: US 10,382,129 B2
(45) Date of Patent: Aug. 13, 2019

(54) TRANSMISSION OF IDENTIFIERS USING VISIBLE LIGHT COMMUNICATION

(71) Applicant: QUALCOMM Incorporated, San Diego, CA (US)

(72) Inventors: Aleksandar Jovicic, Jersey City, NJ (US); Mahadevi Pillai Perumal, Piscataway, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/987,692

(22) Filed: May 23, 2018

(65) Prior Publication Data

US 2018/0269970 A1 Sep. 20, 2018

Related U.S. Application Data

(62) Division of application No. 14/742,185, filed on Jun. 17, 2015, now Pat. No. 10,009,100.
(Continued)

(51) Int. Cl.
*H04B 10/116* (2013.01)
*H04B 10/114* (2013.01)
(Continued)

(52) U.S. Cl.
CPC ....... *H04B 10/116* (2013.01); *H04B 10/1141* (2013.01); *H04L 7/041* (2013.01); *H05B 33/0845* (2013.01)

(58) Field of Classification Search
CPC ...................................... H04B 10/112–10/116
(Continued)

(56) References Cited

U.S. PATENT DOCUMENTS 8,422,476 B2 4/2013 Berggren
8,729,808 B2 5/2014 Knibbe et al.
(Continued)

FOREIGN PATENT DOCUMENTS

CN 101640567 A 2/2010
CN 102612809 A 7/2012
(Continued)

OTHER PUBLICATIONS

European Search Report—EP18165987—Search Authority—Munich—Jul. 12, 2018 (145268EPD1).
(Continued)

*Primary Examiner* — Li Liu
(74) *Attorney, Agent, or Firm* — Holland & Hart LLP

(57) ABSTRACT

Methods, systems, and devices are described for transmitting an identifier using visible light communication (VLC) and for generating a plurality of identifiers for transmission using VLC. Input identifying an illumination factor associated with a light source is received. A first set of modulation parameters is modified for transmitting the identifier using VLC. The first set of modulation parameters is modified based on the illumination factor. A signal, in which the identifier is encoded, is applied to the light source. The signal is applied according to the first set of modulation parameters. Another method includes identifying a number of light transmitting devices, generating a plurality of identifiers based on the identified number of light transmitting devices, storing the generated identifiers, determining a plurality of cyclic shifts for each identifier in the plurality of identifiers, and removing identifiers from the plurality of identifiers that match the identified cyclic shifts.

18 Claims, 18 Drawing Sheets

Related U.S. Application Data

(60) Provisional application No. 62/013,885, filed on Jun. 18, 2014.

(51) Int. Cl.
*H04L 7/04* (2006.01)
*H05B 33/08* (2006.01)

(58) Field of Classification Search
USPC .......................................... 398/118–131, 172
See application file for complete search history.

(56) References Cited

U.S. PATENT DOCUMENTS

| | | | |
|---|---|---|---|
| 10,009,100 B2 | 6/2018 | Jovicic et al. | |
| 2008/0203928 A1* | 8/2008 | Frumau | H05B 37/0272 315/151 |
| 2011/0026917 A1 | 2/2011 | Li et al. | |
| 2011/0043116 A1* | 2/2011 | Schenk | H05B 37/0272 315/152 |
| 2011/0052210 A1 | 3/2011 | Riedl et al. | |
| 2011/0105134 A1* | 5/2011 | Kim | H04W 72/048 455/450 |
| 2012/0087365 A1* | 4/2012 | Berggren | H03M 13/33 370/350 |
| 2012/0098436 A1* | 4/2012 | Talstra | H04B 10/1149 315/132 |
| 2012/0200226 A1* | 8/2012 | Knibbe | H04B 10/1149 315/151 |
| 2012/0281987 A1 | 11/2012 | Schenk et al. | |
| 2013/0110344 A1* | 5/2013 | Merg | G07C 5/008 701/31.4 |
| 2014/0072083 A1 | 3/2014 | Hulvey et al. | |
| 2014/0086590 A1 | 3/2014 | Ganick et al. | |
| 2014/0232903 A1 | 8/2014 | Oshima et al. | |
| 2014/0280316 A1* | 9/2014 | Ganick | H04B 10/1149 707/769 |
| 2014/0372072 A1 | 12/2014 | Guo et al. | |
| 2014/0375217 A1 | 12/2014 | Feri et al. | |
| 2015/0147069 A1* | 5/2015 | Brandt-Pearce | H04L 25/4902 398/186 |
| 2015/0276399 A1 | 10/2015 | Breuer et al. | |
| 2015/0282282 A1 | 10/2015 | Breuer et al. | |
| 2016/0211915 A1 | 7/2016 | Liu et al. | |
| 2017/0124421 A1* | 5/2017 | Van Eeuwijk | H04N 5/2256 |

FOREIGN PATENT DOCUMENTS

| | | |
|---|---|---|
| CN | 102804924 A | 11/2012 |
| JP | 2009206620 A | 9/2009 |
| JP | 2012526354 A | 10/2012 |
| JP | 2012530346 A | 11/2012 |
| WO | WO-2010146519 A1 | 12/2010 |
| WO | WO-2012153220 A1 | 11/2012 |

OTHER PUBLICATIONS

International Search Report and Written Opinion—PCT/US2015/036385—ISA/EPO—Jan. 5, 2016 (145268WO).

Kim S., et al., "Novel FEC Coding Scheme for Dimmable Visible Light Communication Based on the Modified Reed-Muller Codes," IEEE Photonics Technology Letters, Oct. 15, 2011, vol. 23 (20), pp. 1514-1516.

Partial International Search Report—PCT/US2015/036385—ISA/EPO—Sep. 16, 2015 (145268WO).

Second Written Opinion from International Application No. PCT/US2015/036385, dated Sep. 13, 2016, 7 pages (145268WO).

Tsybakov B.S., et al., "Some Constructions of Conflict-Avoiding Codes," Problems of Information Transmission, 2002, vol. 38 (4), pp. 268-279.

* cited by examiner

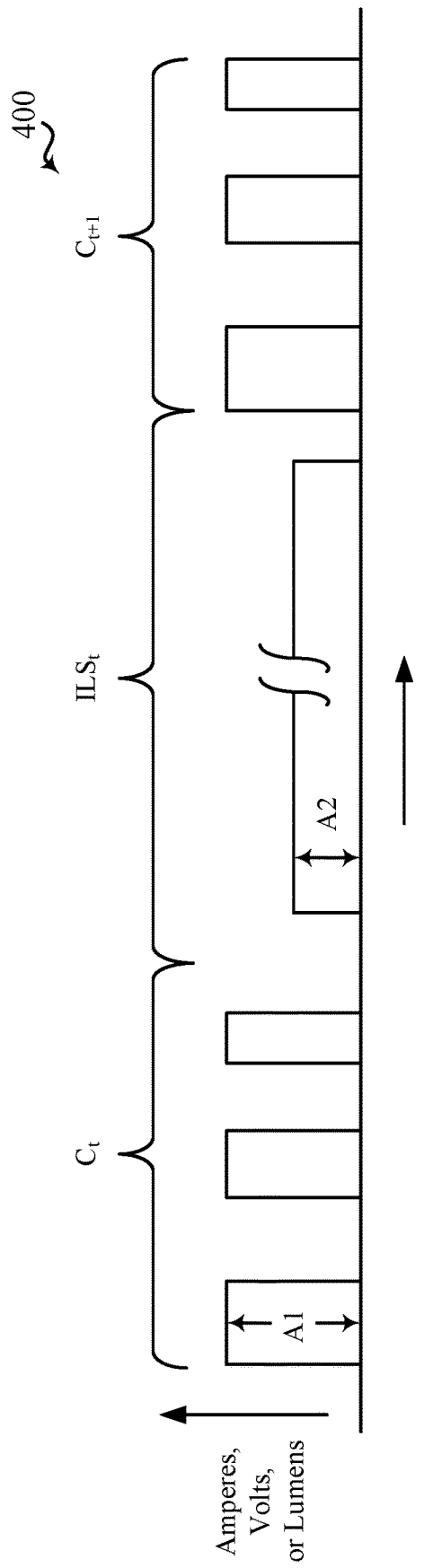
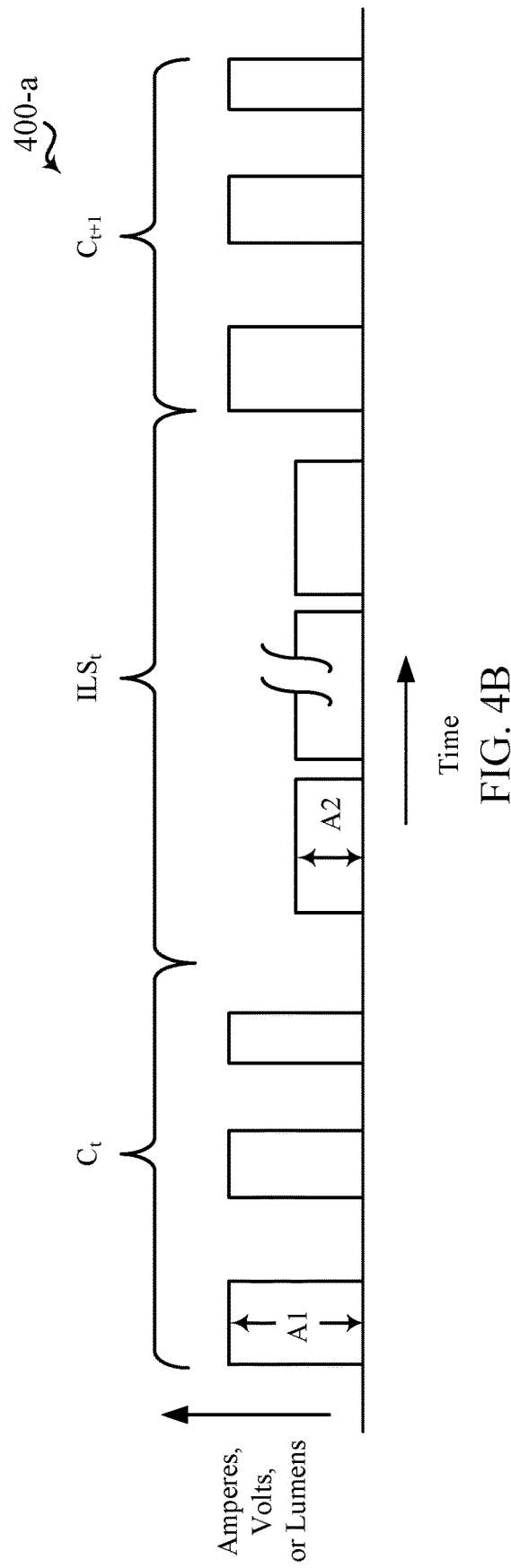
FIG. 4A
FIG. 4B

TRANSMISSION OF IDENTIFIERS USING VISIBLE LIGHT COMMUNICATION

CROSS REFERENCES

The present application for patent is a Divisional of U.S. patent application Ser. No. 14/742,185 by Jovicic et al. entitled "Transmission of Identifiers Using Visible Light Communication," filed Jun. 17, 2015; which claims benefit of U.S. Provisional Patent Application No. 62/013,885 by Jovicic et al. entitled "Enhanced Transmission of Unique Identifiers Using Visible Light Communication," filed Jun. 18, 2014; each of which are assigned to the assignee hereof and expressly incorporated by reference herein in their entirety.

FIELD OF THE DISCLOSURE

The present disclosure, for example, relates to wireless communication systems, and more particularly to techniques for transmission of identifiers (e.g., unique identifiers of light transmitting devices) using visible light communication.

BACKGROUND

Visible light communication (VLC) involves the transmission of information through modulation of the light intensity of a light source (e.g., the modulation of the light intensity of one or more light emitting diodes (LEDs)). Generally, visible light communication is achieved by transmitting, from a light source such as an LED or laser diode (LD), a modulated visible light signal, and receiving and processing the modulated visible light signal at a receiver (e.g., a mobile device) having a photo detector (PD) or array of PDs (e.g., a complementary metal-oxide-semiconductor (CMOS) image sensor (e.g., a camera)).

As the light emission efficiency of the LED is improved and the cost thereof decreases, the LED has become common in use in general lighting applications for residential, commercial, outdoor, and industrial market segments. The LED has also become common in special lighting applications as portable devices, display devices, vehicles, sign lamps, signboards, etc. By modulating an LED at a high speed at which the modulation cannot be perceived by a human being, it is possible to transmit data at high speeds. The distance and position of a receiver from the light source, however, may impact the receiver's ability to correctly demodulate and decode the data communicated from the light source using VLC signals. For example, if the receiver is a certain distance away from the light source, the receiver may be able to demodulate and decode a portion of the VLC signal. Further, erasures of a portion of the transmitted data may be inherent in the receiver as a result of a rolling shutter in the receiver. As a result, the receiver may not receive all of the information transmitted by the light source.

SUMMARY

In some aspects, the described features generally relate to one or more improved methods, systems, and/or devices for transmitting an identifier using visible light communication (VLC). In other aspects, the described features generally relate to one or more improved methods, systems, and/or devices for generating a plurality of identifiers for transmission using VLC.

In a first set of illustrative examples, a method for transmitting an identifier using VLC is described. In one configuration, the method includes receiving input identifying an illumination factor associated with a light source; modifying a first set of one or more modulation parameters for transmitting the identifier using VLC, where the first set of one or more modulation parameters may be modified based at least in part on the illumination factor; and applying at least one signal in which the identifier is encoded to the light source, the signal being applied in accordance with the first set of one or more modulation parameters.

In some examples of the method, the first set of one or more modulation parameters may include at least one of a pulse duty cycle, a pulse duration, a pulse spacing, a DC bias, a pulse amplitude, or a pulse slope. In some examples of the method, the first set of one or more modulation parameters may include a pulse slope, where the pulse slope follows one of a linear function, a piece-wise linear Gaussian function, a raised cosine function, a polynomial function, or an exponential function. In some examples, each modulation parameter in the first set of one or more modulation parameters may be expressed in units of amperes, volts, or lumens.

In some examples of the method, application of the at least one signal to the light source may modulate a light intensity of the light source to transmit the identifier from the light source using VLC. In some examples, the at least one signal may include at least one of a current signal or a voltage signal.

In some examples of the method, the first set of one or more modulation parameters may be further modified based at least in part on a thermal performance of the light source. In some examples of the method, the first set of one or more modulation parameters may be further modified based at least in part on an acoustic performance of the light source. In some examples of the method, the first set of one or more modulation parameters may be further modified based at least in part on a flicker performance of the light source. In some examples of the method, the first set of one or more modulation parameters may be further modified based at least in part on a signal-to-noise ratio (SNR) of a transmitted instance of the identifier.

In some examples of the method, modifying the first set of one or more modulation parameters based at least in part on the illumination factor may include converting the illumination factor to a total light output, and modifying the first set of one or more modulation parameters based at least in part on the total light output. In some examples, the illumination factor may include a percentage of dimness and the total light output may be expressed in lumens.

In some examples of the method, modifying the first set of one or more modulation parameters may include accessing an electronically stored database that associates illumination factors with modulation parameters. The electronically stored database may in some cases associate at least one illumination factor with at least two different sets of one or more modulation parameters.

In some examples, the method may include modifying a second set of one or more modulation parameters for transmitting an interleaving signal, and alternately applying the at least one signal to the light source in accordance with the first set of one or more modulation parameters or the second set of one or more modulation parameters, to transmit a plurality of instances of the identifier interspersed with a plurality of instances of the interleaving signal. In some examples, the second set of one or more modulation parameters may be modified based at least in part on a thermal performance of the light source. In some examples, the interleaving signal may include a constant current. In some examples, the interleaving signal may include pulses having a fixed frequency. In some examples, the second set of one or more modulation parameters may differ from the first set of one or more modulation parameters. In some examples, the second set of one or more modulation parameters may be modified to match an average light intensity level of a transmitted instance of the interleaving signal to an average light intensity level of a transmitted instance of the identifier.

In some examples of the method, the identifier may be encoded in the at least one signal as a sequence of symbols. In some examples, the sequence of symbols may be based at least in part on a frequency shift keying.

In a second set of illustrative examples, a light transmitting device for transmitting an identifier using VLC is described. In one configuration, the light transmitting device may include means for receiving input identifying an illumination factor associated with a light source; means for modifying a first set of one or more modulation parameters for transmitting the identifier using VLC, where the first set of one or more modulation parameters may be modified based at least in part on the illumination factor; and means for applying at least one signal in which the identifier is encoded to the light source, the at least one signal being applied in accordance with the first set of one or more modulation parameters. In some examples, the light transmitting device may further include means for implementing one or more aspects of the method for transmitting an identifier using VLC described above with respect to the first set of illustrative examples.

In a third set of illustrative examples, another light transmitting device for transmitting an identifier using VLC is described. In one configuration, the light transmitting device may include a processor, memory in electronic communication with the processor, and a receiver configured to receive input identifying an illumination factor associated with a light source; and the processor configured to modify a first set of one or more modulation parameters for transmitting the identifier using VLC, where the first set of one or more modulation parameters may be modified based at least in part on the illumination factor; and apply at least one signal in which the identifier is encoded to the light source, the at least one signal being applied in accordance with the first set of one or more modulation parameters. In some examples, the processor may be further configured to implement one or more aspects of the method for transmitting an identifier using VLC described above with respect to the first set of illustrative examples.

In a fourth set of illustrative examples, a computer program product for transmitting an identifier using VLC is described. In one configuration, the computer program product may include a non-transitory computer-readable medium storing instructions executable by a processor to cause a device to receive input identifying an illumination factor associated with a light source; modify a first set of one or more modulation parameters for transmitting the identifier using VLC, where the first set of one or more modulation parameters may be modified based at least in part on the illumination factor; and apply at least one signal in which the identifier is encoded to the light source, the at least one signal being applied in accordance with the first set of one or more modulation parameters. In some examples, the instructions may also be executable by the processor to cause the device to implement one or more aspects of the method for transmitting an identifier using VLC described above with respect to the first set of illustrative examples.

In a fifth set of illustrative examples, a method for generating a plurality of identifiers for transmission using VLC is described. In one configuration, the method includes identifying a number of light transmitting devices; generating a plurality of identifiers based at least in part on the identified number of light transmitting devices; storing the generated identifiers; determining a plurality of cyclic shifts for each identifier of the plurality of identifiers; removing identifiers from the plurality of identifiers that match the identified cyclic shifts; and assigning each of the number of light transmitting devices a unique identifier from among the identifiers that remain in the plurality of identifiers after removing the identifiers that match the identified cyclic shifts.

In some examples of the method, generating the plurality of identifiers may include selecting an identifier length and an alphabet for generating the plurality of identifiers. In some examples of the method, generating the plurality of identifiers may include selecting the identifier length and the alphabet based at least in part on a number of characters in the alphabet and the identified number of light transmitting devices, and generating the plurality of identifiers as different combinations of alphabet characters having the identifier length.

In some examples, assigning a light transmitting device a unique identifier may include transmitting the unique identifier to the light transmitting device. In some examples, assigning a light transmitting device a unique identifier may include transmitting an index to the light transmitting device. The index may indicate which of a plurality of identifiers stored at the light transmitting device is to be used as the unique identifier of the light transmitting device.

In a sixth set of illustrative examples, a controller for generating a plurality of identifiers for transmission using VLC is described. In one configuration, the controller may include means for identifying a number of light transmitting devices; means for generating a plurality of identifiers based at least in part on the identified number of light transmitting devices; means for storing the generated plurality of identifiers; means for determining a plurality of cyclic shifts for each identifier of the plurality of identifiers; means for removing identifiers from the list that match the identified cyclic shifts; and means for assigning each of the number of light transmitting devices a unique identifier from among the identifiers that remain in the plurality of identifiers after removing the identifiers that match the identified cyclic shifts. In some examples, the controller may further include means for implementing one or more aspects of the method for generating a plurality of identifiers for transmission using VLC described above with respect to the fifth set of illustrative examples.

In a seventh set of illustrative examples, another controller for generating a plurality of identifiers for transmission using VLC is described. In one configuration, the controller may include a processor, memory in electronic communication with the processor, where the processor is configured to identify a number of light transmitting devices; generate a plurality of identifiers based at least in part on the identified number of light transmitting devices; and the memory is configured to store the generated plurality of identifiers. The processor may be further configured to determine a plurality of cyclic shifts for each identifier of the plurality of identifiers; remove identifiers from the list that match the identified cyclic shifts; and assign each of the number of light transmitting devices a unique identifier from among the identifiers that remain in the plurality of identifiers after removing the identifiers that match the identified cyclic shifts. The controller may further include a transmitter configured to transmit information based at least in part on the plurality of identifiers. In some examples, a transmitter may be configured to transmit an index to the light transmitting device, the index indicating which of the plurality of identifiers stored at the light transmitting device is to be used as the unique identifier of the light transmitting device. In some examples, the processor may be further configured to implement one or more aspects of the method for generating a plurality of identifiers for transmission using VLC described above with respect to the fifth set of illustrative examples.

In an eighth set of illustrative examples, a computer program product for generating a plurality of identifiers for transmission using VLC is described. In one configuration, the computer program product may include a non-transitory computer-readable medium storing instructions executable by a processor to cause a device to identify a number of light transmitting devices; generate a plurality of identifiers based at least in part on the identified number of light transmitting devices; store the generated plurality of identifiers; determine a plurality of cyclic shifts for each identifier of the plurality of identifiers; and remove identifiers from the list that match the identified cyclic shifts. In some examples, the instructions may also be executable by the processor to cause the device to implement one or more aspects of the method for generating a plurality of identifiers for transmission using VLC described above with respect to the fifth set of illustrative examples.

In a ninth set of illustrative examples, a method for wireless communication using VLC is described. In one configuration, the method includes transmitting input identifying an illumination factor associated with a light source to a light transmitting device via a controller; receiving at least one signal using VLC, the at least one signal comprising an identifier of the light transmitting device, where the at least one signal is generated at the light transmitting device in accordance with a first set of one or more modulation parameters and the first set of one or more modulation parameters is modified based at least in part on the illumination factor; and decoding the at least one signal to obtain the identifier.

In some examples of the method, the first set of one or more modulation parameters may include at least one of a pulse duty cycle, a pulse duration, a pulse spacing, a DC bias, a pulse amplitude, or a pulse slope, where the pulse slope follows one of a linear function, a piece-wise linear Gaussian function, a raised cosine function, a polynomial function, or an exponential function.

In some examples of the method, the at least one signal being generated at the light transmitting device may include a light intensity of the light source being modulated in accordance with the first set of one or more modulation parameters to transmit the identifier from the light transmitting device using VLC. In some examples, the at least one signal may include at least one of a current signal or a voltage signal.

In some examples of the method, the first set of one or more modulation parameters being modified based at least in part on the illumination factor may include the illumination factor being converted to a total light output; and the first set of one or more modulation parameters being modified based at least in part on the total light output. The illumination factor may include a percentage of dimness and the total light output may be expressed in lumens.

In some examples, the method may include receiving an interleaving signal, where a plurality of instances of the identifier is interspersed with a plurality of instances of the interleaving signal, and the at least one signal is alternately generated at the light transmitting device in accordance with the first set of one or more modulation parameters or a second set of one or more modulation parameters. The second set of one or more modulation parameters may differ from the first set of one or more modulation parameters. The second set of one or more modulation parameters may be modified based at least in part on a thermal performance of the light source. The interleaving signal may be a constant current or pulses having a fixed frequency.

In some examples of the method, the second set of one or more modulation parameters may be modified to match an average light intensity level of a transmitted instance of the interleaving signal to an average light intensity level of a transmitted instance of the identifier.

In a tenth set of illustrative examples, a mobile device for wireless communication using VLC is described. In one configuration, the mobile device may include means for transmitting input identifying an illumination factor associated with a light source to a light transmitting device via a controller; means for receiving at least one signal using VLC, the at least one signal comprising an identifier of the light transmitting device, wherein the at least one signal is generated at the light transmitting device in accordance with a first set of one or more modulation parameters, and the first set of one or more modulation parameters is modified based at least in part on the illumination factor; and means for decoding the at least one signal to obtain the identifier. In some examples, the mobile device may further include means for implementing one or more aspects of the method for wireless communication using VLC described above with respect to the ninth set of illustrative examples.

In an eleventh set of illustrative examples, another mobile device for wireless communication using VLC is described. In one configuration, the mobile device may include a processor, memory in electronic communication with the processor, a transceiver, and an image sensor, where the transceiver configured to transmit input identifying an illumination factor associated with a light source to a light transmitting device via a controller; and the image sensor configured to receive at least one signal using VLC, the at least one signal comprising an identifier of the light transmitting device, where the at least one signal is generated at the light transmitting device in accordance with a first set of one or more modulation parameters and the first set of one or more modulation parameters is modified based at least in part on the illumination factor; and the processor configured to decode the at least one signal to obtain the identifier. In some examples, the processor may be further configured to implement one or more aspects of the method for transmitting an identifier using VLC described above with respect to the ninth set of illustrative examples.

In a twelfth set of illustrative examples, a computer program product for wireless communication using VLC is described. In one configuration, the computer program product may include a non-transitory computer-readable medium storing instructions executable by a processor to cause a device to transmit input identifying an illumination factor associated with a light source to a light transmitting device via a controller; receive at least one signal using VLC, the at least one signal comprising an identifier of the light transmitting device, where the at least one signal is generated at the light transmitting device in accordance with a first set of one or more modulation parameters and the first set of one or more modulation parameters is modified based at least in part on the illumination factor; and decode the at least one signal to obtain the identifier. In some examples, the instructions may also be executable by the processor to cause the device to implement one or more aspects of the method for wireless communication using VLC described above with respect to the ninth set of illustrative examples.

Further scope of the applicability of the described methods and devices will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4A illustrates an example of part or all of a signal modulated in accordance with the transmission of a plurality of instances of an identifier and a plurality of instances of an interleaving signal, in accordance with various aspects of the present disclosure;

FIG. 4B illustrates another example of part or all of a signal modulated in accordance with the transmission of a plurality of instances of an identifier and a plurality of instances of an interleaving signal, in accordance with various aspects of the present disclosure;

DETAILED DESCRIPTION

Transmission and reception of data using visible light communication (VLC) is described. In some examples, the described methods, systems, and devices may use rateless VLC, which is a communication method in which a light transmitting device may repetitively (and in some cases, continually) transmit a piece of information (e.g., an identifier) and a VLC-compatible device or devices in the vicinity of the light transmitting device may receive and decode transmissions of the identifier until enough of the identifier is captured to reconstruct the identifier. In some cases, the entirety of the identifier may be captured. Each repetition of the identifier may convey the same information. In practice, symbols of the identifier may be lost (erased) due to temporary outages in the VLC link (e.g., as a result of physical obstructions, or as a result of an increase in the distance between the light transmitting device and a receiver of the VLC-compatible device). Because of this property, the communication method may be said to be "rateless"— i.e., the number of codewords that need to be transmitted and received in order to reconstruct the codeword may vary.

When a light transmitting device is used for both illumination and communication purposes, there may exist tension between the illumination and communication requirements of the signal or signals used to drive the light source. Some embodiments of the disclosure provide ways to modify modulation parameters for the signal or signals so that the requirements of both illumination and communication functions may be satisfactorily met.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
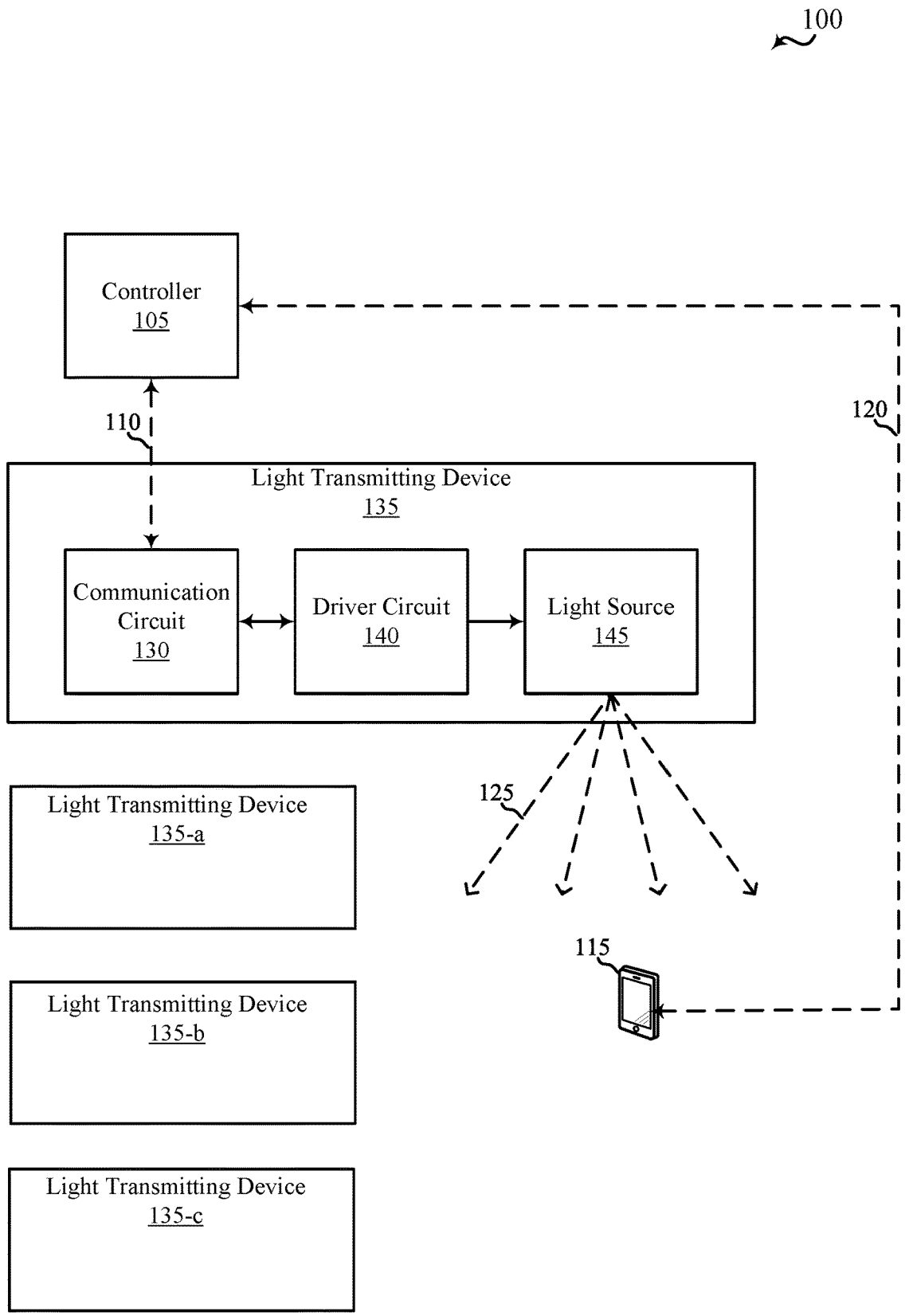
FIG. 1 shows a block diagram illustrating an example of a wireless communications system, in accordance with various aspects of the present disclosure.

FIG. 1 shows a block diagram illustrating an example of a VLC system 100, in accordance with various aspects of the present disclosure. By way of example, the VLC system 100 may include a controller 105, a light transmitting device 135, and/or a mobile device 115. In some examples, the VLC system 100 may include any number of controllers 105, mobile devices 115, and/or light transmitting devices 135. In some cases, the controller 105 (or aspects of the controller 105) may be provided by the mobile device 115. In these cases, the mobile device 115 may communicate directly with the light transmitting device 135.

The light transmitting device 135 may include a communication circuit 130, a driver circuit 140, and/or a light source 145. In some examples, the light source 145 may include one or more light emitting diodes (LEDs) and/or other light emitting elements. In some examples, a single light source 145 or commonly controlled group of light emitting elements may be provided (e.g., a single light source 145 or commonly controlled group of light emitting elements may be used for ambient illumination and VLC transmissions). In other configurations, the light source 145 may be replaced with multiple light sources or separately controlled groups of light emitting elements (e.g., a first light source may be used for ambient illumination, and a second light source may be used for VLC transmissions).

The driver circuit 140 or intelligent ballast may be used to drive the light source 145. In some examples, the driver circuit 140 may drive the light source 145 using a current signal and/or a voltage signal. In some configurations, some of the intelligence of the driver circuit 140 or intelligent ballast may be moved to the controller 105.

By way of example, the controller 105 may take the form of a desktop computer or wall-mounted control pad. The functions of the controller 105 may also be provided by the mobile device 115. The controller 105 may also be a switch, such as an ON/OFF/dimming switch. A user may select or input an illumination factor (e.g., a percentage of dimness) via the controller 105, which illumination factor may be provided by the controller 105 to the light transmitting device 135. In some examples, the controller 105 may provide the illumination factor to a communication circuit 130 of the light transmitting device 135. By way of example, the illumination factor may be provided to the communication circuit 130 over a power line network, a wireless local area network (WLAN; e.g., a Wi-Fi network), and/or a wireless wide area network (WWAN; e.g., a cellular network such as a Long Term Evolution (LTE) or LTE-Advanced (LTE-A) network). The network or networks over which the controller 105 and communication circuit 130 communicate provide a number of (e.g., one or more) communication links 110 between the controller 105 and the communication circuit 130.

In some examples, the controller 105 may also provide the light transmitting device 135 an identifier for transmission using VLC. In some examples, the controller 105 may receive status information from the light transmitting device 135. The status information may include, for example, a light intensity of the light source 145, a thermal performance of the light source 145, and/or an identifier of the light transmitting device 135.

The mobile device 115 may also take various forms, and in some examples may be a mobile phone or table computer. The mobile device 115 may be able to communicate over different access networks, such as other WLANs and/or WWANs. In some examples, the mobile device may communicate uni-directionally or bi-directionally with the controller 105. In some examples, the mobile device 115 may also or alternatively communicate directly with the light transmitting device. The network or networks over which the mobile device 115 and controller 105 communicate provide a number of communication links 120 between the mobile device 115 and the controller 105.

When the light transmitting device 135 is in an ON state, the light source 145 may provide ambient illumination 125 which may be captured by an image sensor (e.g., a camera) of the mobile device 115. The light source 145 may also make VLC transmissions that may be captured by the image sensor of the mobile device 115. As described herein, the illumination and/or VLC transmissions may be used by the mobile device 115 for navigation and/or other purposes.

In some examples, the light transmitting device 135 may receive one or more modulation parameters by other entity. For example, the modulation parameters may be received by the light transmitting device and stored locally inside the light source's memory (e.g., electrically erasable programmable read-only memory (EEPROM) or other storage device, and may be loaded into the light source (e.g., a driver circuit) upon receiving a command. In other examples, the modulation parameters may be received from a remote entity such as a mobile device or a sever over a wired or wired link.

Figure 2:
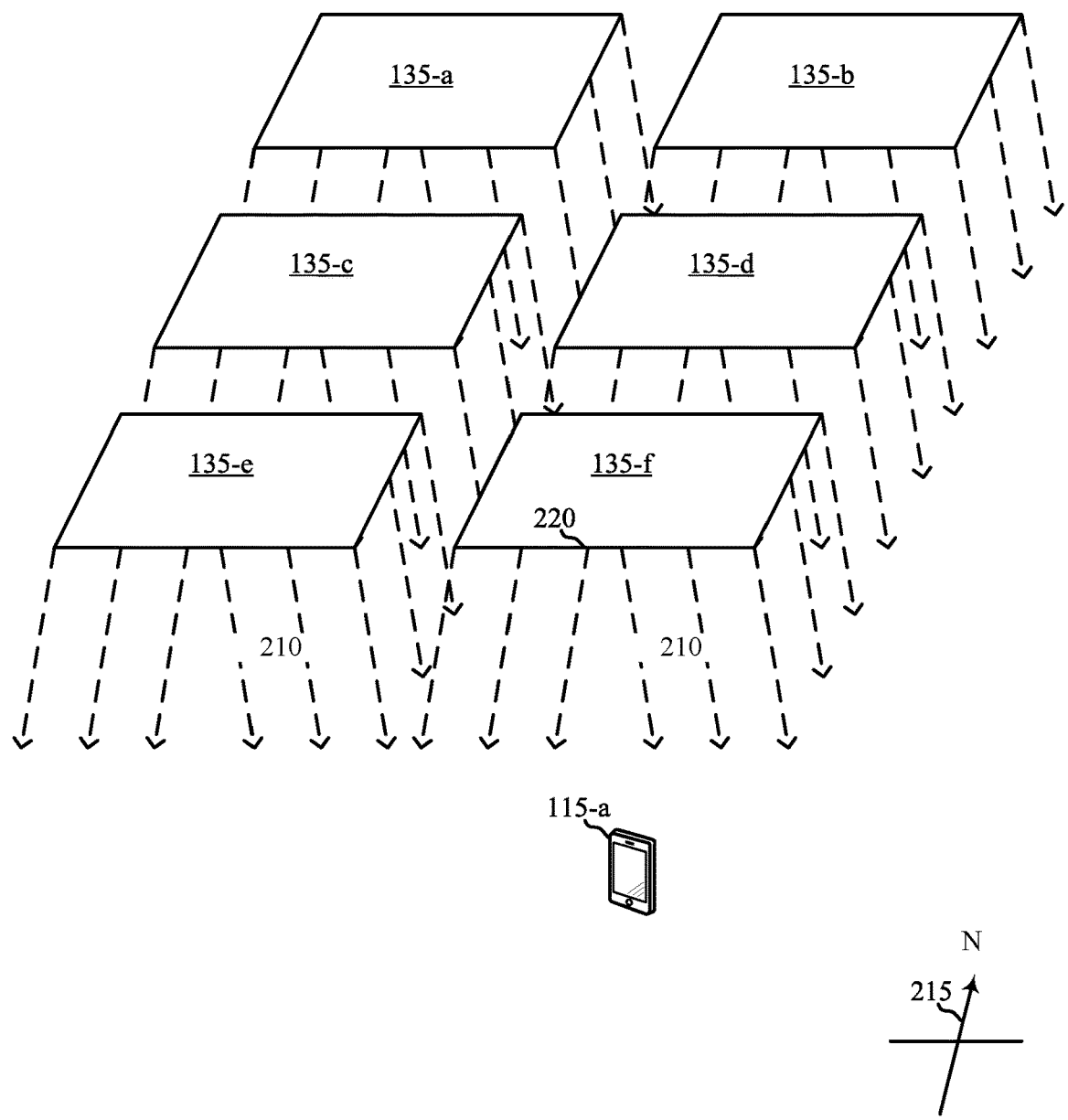
FIG. 2 is a diagram illustrating an example of a mobile device positioned below a number of light transmitting devices, in accordance with various aspects of the present disclosure.

Referring now to FIG. 2, a diagram 200 illustrates an example of a mobile device 115-a positioned below a number of light transmitting devices 135-a, 135-b, 135-c, 135-d, 135-e, and 135-f. The mobile device 115-a may in some cases be an example of the mobile device 115 described with reference to FIG. 1 The light transmitting devices 135-a, 135-b, 135-c, 135-d, 135-e, and 135-f may in some cases be examples of aspects of the light transmitting device 135 described with reference to FIG. 1. The light transmitting devices 135-a, 135-b, 135-c, 135-d, 135-e, and 135-f may in some examples be overhead light transmitting devices in a building, which overhead light transmitting devices may have fixed locations with respect to a reference (e.g., a global positioning system (GPS) coordinate system and/or building floor plan). In some cases, the light transmitting devices 135-a, 135-b, 135-c, 135-d, 135-e, and 135-f may also have orientations with respect to a reference (e.g., a meridian passing through magnetic north 215).

In some examples, the mobile device 115-a may include an image sensor (e.g., a camera of the mobile device 115-a). As the mobile device 115-a moves (or is moved) under one or more of the light transmitting devices 135-a, 135-b, 135-c, 135-d, 135-e, and 135-f, the image sensor of the mobile device 115-a may receive light 210 emitted by one or more of the light transmitting devices 135-a, 135-b, 135-c, 135-d, 135-e, and 135-f and capture an image of part or all of one or more of the light transmitting devices 135-a, 135-b, 135-c, 135-d, 135-e, and 135-f. The image sensor may also or alternatively receive VLC transmissions from one or more of the light transmitting devices 135-a, 135-b, 135-c, 135-d, 135-e, and 135-f. The captured image may include an illuminated reference axis, such as the illuminated edge 220 of the light transmitting device 135-f. Such illuminated edges may enable the mobile device to determine its location and/or orientation with reference to one or more of the light transmitting devices 135-a, 135-b, 135-c, 135-d, 135-e, and 135-f. Alternatively or additionally, the mobile device 115-a may receive, from one or more of the light transmitting devices 135-a, 135-b, 135-c, 135-d, 135-e, and 135-f, VLC transmissions that include identifiers of one or more of the light transmitting devices 135-a, 135-b, 135-c, 135-d, 135-e, and 135-f. The received identifier(s) may be used to determine a location of the mobile device 115-a with respect to the light transmitting devices 135-a, 135-b, 135-c, 135-d, 135-e, and 135-f, and/or to look up locations of one or more of the light transmitting devices 135-a, 135-b, 135-c, 135-d, 135-e, and 135-f and determine, for example, a location of the mobile device 115-a with respect to a GPS coordinate system and/or building floor plan. Additionally or alternatively, the mobile device 115-a may use the locations of one or more of the light transmitting devices 135-a, 135-b, 135-c, 135-d, 135-e, and 135-f, along with captured images of the light transmitting devices 135-a, 135-b, 135-c, 135-d, 135-e, and 135-f, to determine a more precise location and/or orientation of the mobile device 115-a.

Upon determining the location and/or orientation of the mobile device 115-a, the location and/or orientation may be used for navigation by the mobile device 115-a.

Figure 3A:
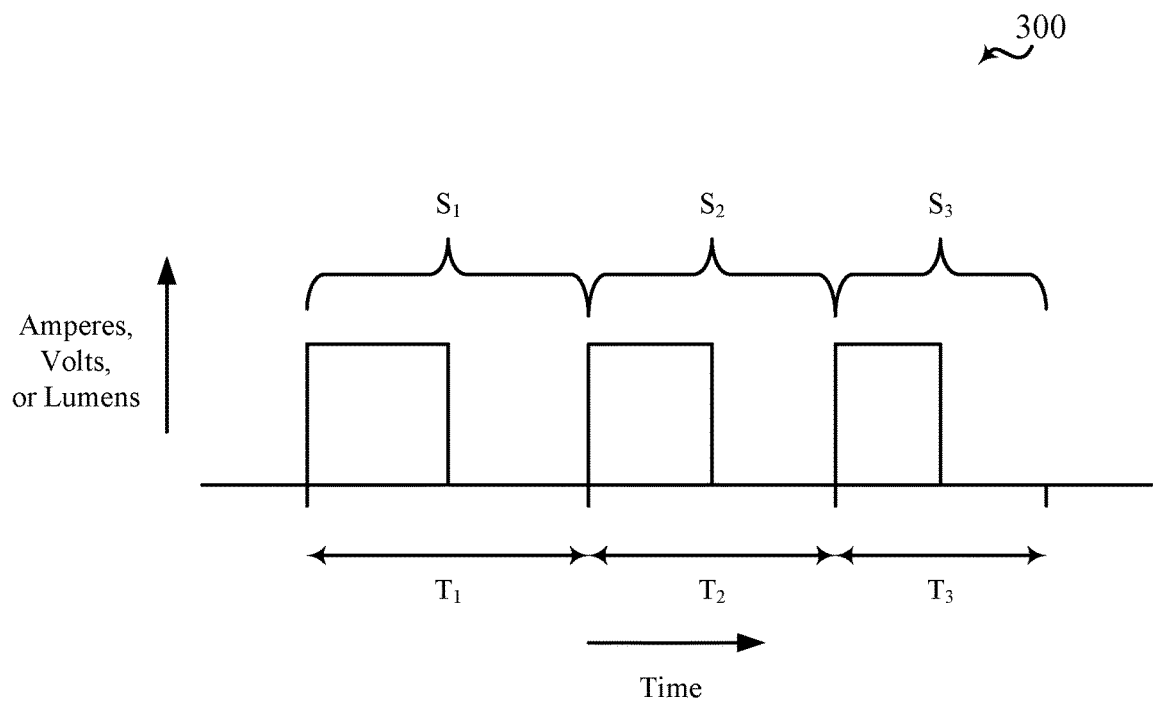
FIG. 3A illustrates an example of part or all of an identifier encoded in a signal modulated in accordance with the transmission of the identifier from a light source using visible light communication (VLC), in accordance with various aspects of the present disclosure.

FIG. 3A illustrates an example of part or all of an identifier encoded in a signal 300 modulated in accordance with the transmission of the identifier from a light source using VLC. The signal 300 may variously represent a current signal and/or a voltage signal applied to the light source. The signal 300 may alternatively represent a light output of the light source. The light source may in some cases be an example of aspects of the light source 145 described with reference to FIG. 1.

In some examples, a basic unit of transmission of the signal 300 is a symbol. In FIG. 3A, three symbols (e.g., symbols $S_1$, $S_2$, and $S_3$) are shown. Each symbol may be mapped to a unique time interval (e.g., the symbols $S_1$, $S_2$, and $S_3$ may be respectively mapped to the time intervals $T_1$, $T_2$, and $T_3$). During each time interval, the signal 300 may be logically "ON" for a portion of the time interval and logically "OFF" for a portion of the time interval. In some examples, the portion of a time interval in which the signal 300 is logically ON may define a pulse. A pulse may alternatively be defined by the portion of a time interval in which the signal 300 is logically OFF.

By way of example, the durations of the time intervals $T_1$, $T_2$, and $T_3$ may be $T_1$=540 microseconds (µs), $T_2$=420 µs, and $T_3$=300 µs. In some examples, the durations of the time intervals $T_1$, $T_2$, and $T_3$ to which the symbols $S_1$, $S_2$, and $S_3$ are mapped may be based at least in part on a frequency shift keying. An identifier may be encoded in the signal 300 as a sequence of the symbols (e.g., an identifier having an identifier length of four symbols may be defined by the sequence $S_1$, $S_3$, $S_1$, $S_2$). In some cases, a plurality of instances of the identifier may be encoded in the signal 300 and transmitted back-to-back. In some examples, the instances of the identifier may be separated by instances of an interleaving signal, as described with reference to FIGS. 4A and/or 4B. An identifier length of four symbols and an alphabet size of three symbols are representative only, and in other embodiments, the identifier length may be longer or shorter and the alphabet size may be larger or smaller.

Figure 3B:
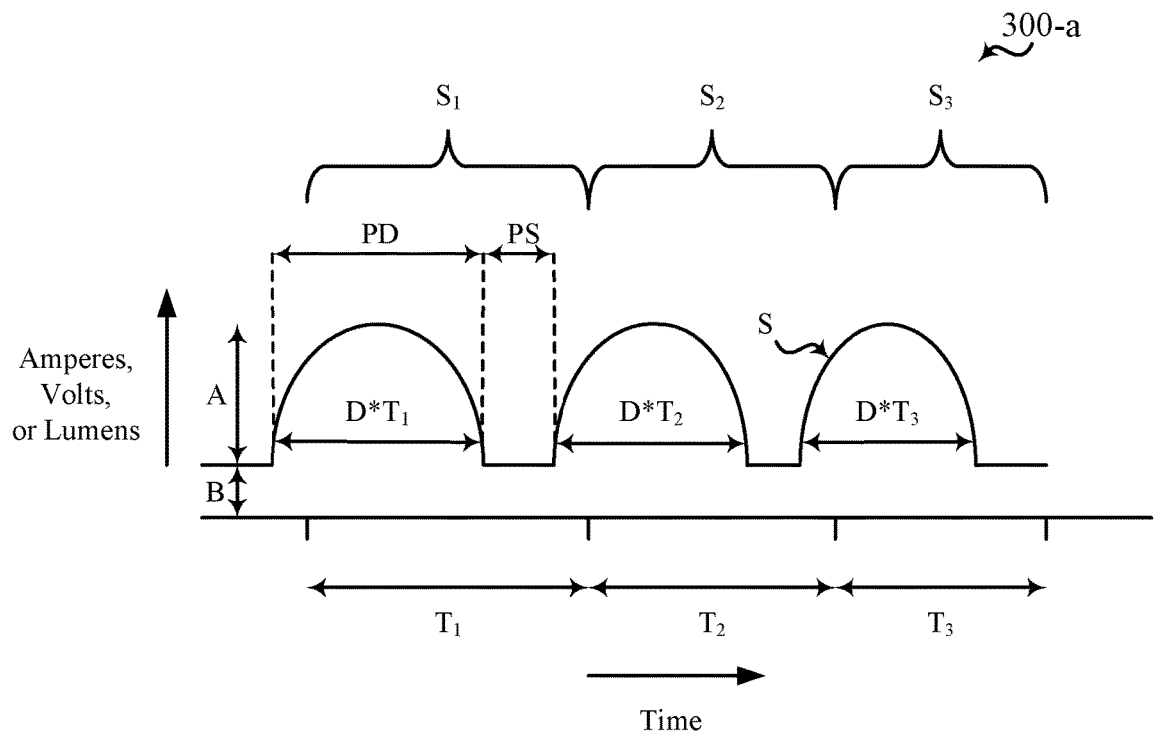
FIG. 3B illustrates an example of a signal to which a set of one or more modulation parameters has been applied, in accordance with various aspects of the present disclosure.

FIG. 3B illustrates a signal 300-a to which a set of one or more modulation parameters has been applied. In some examples, the signal 300-a may be a modulated version of the signal 300 described with reference to FIG. 3A. The set of one or more modulation parameters may include, for example, a pulse duty cycle, a pulse duration, a pulse spacing, a DC bias, a pulse amplitude, and/or a pulse slope.

The pulse duty cycle, D, may be defined as the fraction of time that the signal 300-a spends in a logical ON state relative to a time interval (e.g., relative to the time interval $T_1$, $T_2$, and $T_3$). The value of D may range from 0 to 1.

The pulse duration, PD, may be defined as the time that the signal 300-a spends in a logical ON state during a time interval. In some cases, the pulse duration may be selected. Alternatively, the pulse duration may be computed (e.g., the pulse duration may be computed as the length of a time interval multiplied by the modulation parameter D). Thus, the pulse duration for time interval $T_1$ is $D*T_1$; the pulse duration for time interval $T_2$ is $D*T_2$; and the pulse duration for time interval $T_3$ is $D*T_3$.

The pulse spacing, PS, may be defined as the time that the signal 300-a spends in a logical OFF state during a time interval. In some cases, the pulse spacing may be selected. Alternatively, the pulse spacing may be computed (e.g., the pulse spacing may be computed as the length of a time interval multiplied by the factor (1-D), or as the length of a time interval less a pulse duration for the time interval).

The DC bias, B, may be defined as the current level that is nominally transmitted between pulses (e.g., during times when the signal 300-a is in a logical OFF state). The DC bias may be raised to mitigate or prevent flicker in a light source. However, if the DC bias is too high, a signal-to-noise ratio (SNR) of a transmitted instance of an identifier may deteriorate. The value of the DC bias may range from zero current to a maximum current level.

The pulse amplitude, A, may be defined as the difference, in amperes, between a peak current and the DC bias. The peak current may occur during times when the signal 300-a is in a logical ON state. The pulse amplitude may range from 0 to the peak current, depending on the value of the DC bias. In some cases, the amplitude of the signal 300-a during a time interval may not be binary. For example, different symbols and/or portions of a symbol may be represented by different logic levels (e.g., currents and/or voltages of different amplitude), or the signal 300-a may be switched from OFF-to-ON or ON-to-OFF over a transition time in which the amplitude of the signal 300-a is ramped up or down from one current and/or voltage amplitude to another. The transition time may in some cases be selected as a function of the pulse duration (e.g., 10% of the pulse duration).

The pulse slope, S, may be defined as the slope of a pulse during an OFF-to-ON or ON-to-OFF transition. The pulse slope may, in some examples, follow one of a linear function, a piece-wise linear Gaussian function, a raised cosine function, a polynomial function, or an exponential function.

In some cases, the DC bias may be raised, the amplitude may be lowered, and/or the pulse slope may be made gentler, to reduce the severity of OFF-to-ON and ON-to-OFF transitions, which transitions may cause a light source to produce excessive heat when the amplitude is too great or the slope is too steep. An OFF-to-ON or ON-to-OFF transition having too steep a slope may also give rise to acoustic effects (e.g., high frequency harmonics in inductors and other elements of a driver circuit 140 which generate acoustic waves and, under some conditions, audible signals). A gentler slope can reduce these acoustic effects.

The modulation parameters described with reference to FIG. 3B may in some cases be modified based at least in part on an illumination factor (e.g., a percentage of dimness) associated with a light source. The illumination factor may at times be adjusted by a user and/or controller. Thus, one or more of the modulation parameters described with reference to FIG. 3B may be adjusted.

In some examples, one or more modulation parameters may be adjusted (e.g., modified) so that a total light output of a light source is equal to a predetermined value (e.g., in lumens or amperes). The total light output, V, may be based at least in part on an illumination factor (e.g., a percentage of dimness). In some examples, a set of one or more modulation parameters may be modified upon adjustment of an illumination factor so that the modulation parameters satisfy the equation:

$$\Sigma_t A_t D_t T_t + B_t = V,$$

where the parameter t varies by symbol and time interval in the signal 300-a. In some examples, the amplitude (A), duty cycle (D), and DC bias (B) may be fixed from symbol to symbol, thereby simplifying the above equation to:

$$B + AD\Sigma_t T_t = V.$$

Because many solutions to the above equations exist, a particular solution (or set of one or more modulation parameters) may be chosen based on factors other than an illumination factor. For example, a solution that maximizes the modulation parameter A may provide a better SNR. However, the modulation parameter A may also or alternatively be modified based on a flicker performance of a light source (e.g., a larger value for A may increase flicker, and some values of the modulation parameter A may yield unacceptable amounts of flicker). A set of one or more modulation parameters may also or alternatively be modified, for example, based on a thermal performance of a light source (e.g., to mitigate or prevent excessive heat production by the light source) and/or an acoustic performance of the light source (e.g., to mitigate or prevent humming of the light source).

As previously indicated, the value of V may be expressed in units of lumens or amperes. The value of V may also be expressed in units of volts. However, an illumination factor may be expressed as a percentage of dimness. To convert from a percentage of dimness, P, to a total light output, V, the percentage P may be multiplied by the maximum light output in amperes, lumens, or volts (e.g., $P^*V_{max}$). In other examples, a mapping between percentages of dimness and total light output may follow, for example, a linear curve or a logarithmic curve. In some cases, a mapping between percentages of dimness and total light output may be specified by an electronically-stored table.

FIG. 4A illustrates an example of part or all of a signal 400 modulated in accordance with the transmission of a plurality of instances of an identifier and a plurality of instances of an interleaving signal. The signal 400 may be transmitted from a light source using VLC. The signal 400 may variously represent a current signal and/or a voltage signal applied to the light source. The signal 400 may alternatively represent a light output of the light source. The light source may in some cases be an example of aspects of the light source 145 described with reference to FIG. 1.

In some examples, instances of the identifier (e.g., instances $C_t$ and $C_{t+1}$) may be encoded in the signal 400 as described with reference to FIG. 3A, and modulated as described with reference to FIG. 3B. In addition, a plurality of instances of an interleaving signal, $ILS_t$, may be interspersed with the instances of the identifier. Transmission of the interleaving signal may help to improve the thermal performance of the light source (e.g., lower heat dissipation).

As shown in FIG. 4A, the interleaving signal $ILS_t$ may include a constant current transmitted in accordance with various modulation parameters (e.g., a pulse duty cycle, a pulse duration, a DC bias, a pulse amplitude, and/or a pulse slope). The set of one or more modulation parameters applied to the signal 400 for transmission of instances of the interleaving signal, $ILS_t$, may differ from the set of one or more modulation parameters applied to the signal 400 for transmission of instances of the identifier, $C_t$ and $C_{t+1}$. In some cases, the set of one or more modulation parameters applied to instances of the identifier and/or the set of one or more modulation parameters applied to instances of the interleaving signal may change over time (e.g., because of one or more changes in illumination factor, changes in the thermal performance of the light source, changes in the acoustic performance of the light source, changes in the flicker performance of the light source, and/or changes in the SNR of transmitted instances of the identifier).

In some examples, the set of one or more modulation parameters used when transmitting instances of the interleaving signal may be modified to match an average light intensity level of a transmitted instance of the interleaving signal to an average light intensity level of a transmitted instance of the identifier. Such a modification of the set of one or more modulation parameters may mitigate or prevent flicker of the light source.

In some embodiments, the amplitude (A1) of a transmitted instance of the identifier may be greater than the amplitude (A2) of a transmitted instance of the interleaving signal, and the duration of a transmitted instance of the interleaving signal may be greater than the duration of a transmitted instance of the identifier (e.g., 100 milliseconds (ms) compared to 10 ms).

FIG. 4B illustrates an example of part or all of a signal 400-a modulated in accordance with the transmission of a plurality of instances of an identifier and a plurality of instances of an interleaving signal. The signal 400-a may be transmitted from a light source using VLC. The signal 400-a may variously represent a current signal and/or a voltage signal applied to the light source. The signal 400-a may alternatively represent a light output of the light source. The light source may in some cases be an example of aspects of the light source 145 described with reference to FIG. 1.

In some examples, instances of the identifier (e.g., instances $C_t$ and $C_{t+1}$) may be encoded in the signal 400-a as described with reference to FIG. 3A, and modulated as described with reference to FIG. 3B. In addition, a plurality of instances of an interleaving signal, $ILS_t$, may be interspersed with the instances of the identifier. Transmission of the interleaving signal may help to improve the thermal performance of the light source (e.g., lower heat dissipation).

As shown in FIG. 4B, the interleaving signal may include pulses having a fixed frequency, which pulses may be transmitted in accordance with various modulation parameters (e.g., a pulse duty cycle, a pulse duration, a pulse spacing, a DC bias, a pulse amplitude, and/or a pulse slope). The fixed frequency of the pulses of the interleaving signal may enable a mobile device and/or other VLC receiver to distinguish an instance of the interleaving signal from an instance of the identifier (which may include a number of pulses generated in accordance with a frequency shift keying).

The set of one or more modulation parameters applied to the signal 400-a for transmission of instances of the interleaving signal, $ILS_t$, may differ from the set of one or more modulation parameters applied to the signal 400-a for transmission of instances of the identifier, $C_t$ and $C_{t+1}$. In some cases, the set of one or more modulation parameters applied to instances of the identifier and/or the set of one or more modulation parameters applied to instances of the interleaving signal may change over time (e.g., because of one or more changes in illumination factor, changes in the thermal performance of the light source, changes in the acoustic performance of the light source, changes in the flicker performance of the light source, and/or changes in the SNR of transmitted instances of the identifier).

In some examples, the set of one or more modulation parameters used when transmitting instances of the interleaving signal may be modified to match an average light intensity level of a transmitted instance of the interleaving signal to an average light intensity level of a transmitted instance of the identifier. Such a modification of the set of one or more modulation parameters may mitigate or prevent flicker of the light source.

In some embodiments, the amplitude (A1) of a transmitted instance of the identifier may be greater than the amplitude (A2) of a transmitted instance of the interleaving signal, and the duration of a transmitted instance of the interleaving signal may be greater than the duration of a transmitted instance of the identifier (e.g., 100 milliseconds (ms) compared to 10 ms).

Figure 5:
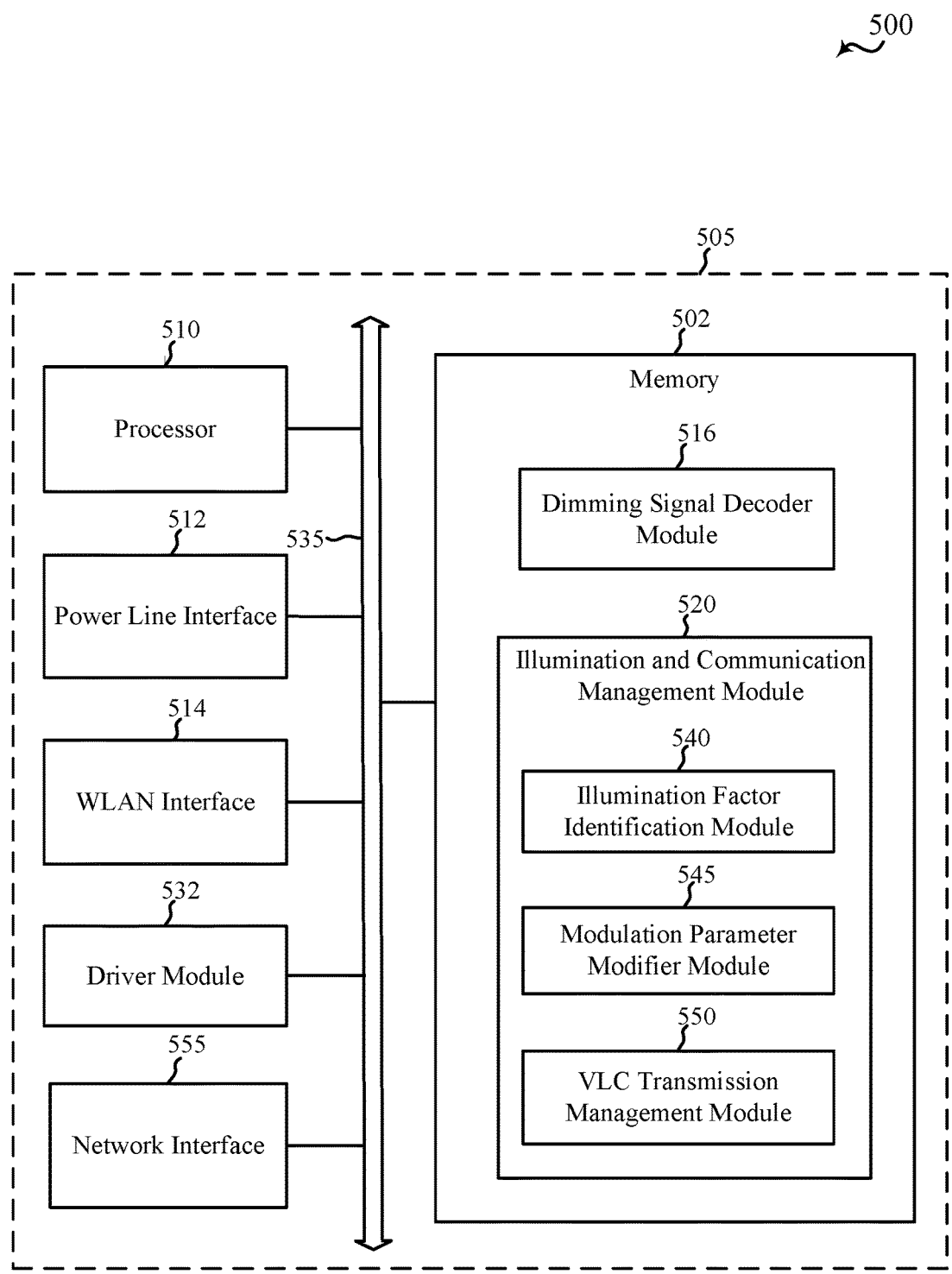
FIG. 5 illustrates a block diagram of a light transmitting device for managing illumination and communication functions of a light transmitting device, in accordance with various aspects of the present disclosure.

Referring now to FIG. 5, a block diagram 500 illustrates an example of a light transmitting device 505 for managing illumination and communication functions of a light transmitting device 135 (e.g., a light transmitting device having aspects of one or more of the light transmitting devices 135 described with reference to FIGS. 1 and/or 2). The light transmitting device 505 may be an example of aspects of one or more of the light transmitting devices 135 and/or aspects of one or more of the driver circuits 140 of the light transmitting devices 135. The light transmitting device 505 may in some cases drive and/or include one or more LEDs. The light transmitting device 505 may include a memory 502, a processor 510, a power line interface 512, WLAN interface 514, a driver module 532, and a network interface 555. Each of these components may be in communication with each other, directly or indirectly, over one or more buses 535. In some embodiments, some of the components may be optional.

In some examples, the power line interface 512 and/or a wireless local area network (WLAN) interface 514 can be a receiver (e.g., a power line receiver, or Wi-Fi receiver), a transmitter (e.g., a power line transmitter, or Wi-Fi transmitter), or a transceiver (e.g., a power line transceiver, or Wi-Fi transceiver). The light transmitting device 505 may also include alternate and/or additional interfaces modules for communications with other networks such as a WWAN (e.g., a cellular network such as an LTE/LTE-A), a Bluetooth (BT), and/or a BT Low Energy (BTLE). The power line interface 512 or WLAN interface 514 may be used to receive, for example, command and/or control signals from a light switch located at a light transmitting device 135 or on a wall, or a user interface provided by a mobile device 115 (e.g., a mobile phone or tablet computer) or controller (e.g., a desktop computer or wall-mounted control pad). The commands and/or control signals may in some cases include an illumination factor, such as a percentage of dimness for setting or adjusting a light intensity of a light source 145, or an identifier of a light transmitting device 135.

In embodiments, the memory 502 of the device may store code for instructions (referred to as modules for example) to implement various functions related to VLC communications. For example, the memory 502 may include a dimming signal decoder module 516 and an illumination and communication management module 520. The illumination and communication management module 520 may include an illumination factor identification module 540, a modulation parameter modifier module 545, and/or a VLC transmission management module 550. These modules can be executed by the processor 510. In some embodiments, the modules can be executed in a dedicated hardware (e.g., a circuit or circuitry) for performing the functions described herein.

The dimming signal decoder module 516 may receive dimming signals from a controller. In some examples, the dimming signals may include digital dimming signals (e.g., dimming signals generated in accordance with the Digital Addressable Lighting Interface (DALI™) protocol and/or the Digital Multiplex (DMX) protocol) and/or analog signals (e.g., 0-10V DC signals). In some examples, the dimming signals may be received from the controller over a conductor such as an American National Standards Institute (ANSI) Category (CAT) x cable (e.g., a CAT 5 cable) or a dedicated copper wire. Upon receipt of a dimming signal, the dimming signal decoder module 516 may derive an illumination factor (e.g., a percentage of dimness) from the dimming signal.

In some examples, the light transmitting device 505 may include a driver module 532. The driver module 532 may generate a current signal, voltage signal, and/or other signal to provide a signal for modulating the light intensity of a light source 145. In some examples, the light transmitting device 505 may also include the light source 145 described with reference to FIG. 1. The WLAN interface 514, power line interface 512, or other additional interfaces may be used to transmit, for example, status information to a user interface provided by a mobile device 115 (e.g., a mobile phone or tablet computer) or controller (e.g., a desktop computer or wall-mounted control pad). The status information may in some cases include a light intensity of a light source 145, a thermal performance of the light source 145, and/or an identifier of a light transmitting device 135.

The illumination and communication management module 520 may be used to perform various functions related to providing illumination using a light source 145 and/or modulating a light intensity of the light source 145 for VLC. In some examples, the illumination and communication management module 520 may include an illumination factor identification module 540, a modulation parameter modifier module 545, and/or a VLC transmission management module 550.

In some examples, the illumination factor identification module 540 may be used to identify an illumination factor associated with a light source 145. The illumination factor may in some cases include a percentage of dimness. The illumination factor may be identified by receiving input identifying an illumination factor associated the light source.

In some examples, the modulation parameter modifier module 545 may be used to modify a set of one or more modulation parameters for transmitting an identifier (e.g., an identifier of a light transmitting device 135) using VLC. The set of one or more modulation parameters may be modified based at least in part on the illumination factor identified by the illumination factor identification module 540.

In some examples, the modulation parameter modifier module 545 may be used to alternatively or additionally modify the set of one or more modulation parameters based at least in part on a thermal performance of the light source 145, an acoustic performance of the light source 145, a flicker performance of the light source 145, and/or an SNR of a transmitted instance of the identifier.

In some examples, the set of one or more modulation parameters may include at least one of a pulse duty cycle, a pulse duration, a pulse spacing, a DC bias, a pulse amplitude, and/or a pulse slope. In some examples, the pulse slope may follow a linear function, a piece-wise linear Gaussian function, a raised cosine function, a polynomial function, or an exponential function. In some examples, each of the modulation parameters may be expressed in units of amperes, volts, or lumens.

Further examples of the modification(s) performed by the modulation parameter modifier module 545 are described with reference to FIGS. 3A and 3B.

In some examples, the modulation parameter modifier module 545 may modify the set of one or more modulation parameters by accessing an electronically stored database that associates illumination factors with modulation parameters. Upon the illumination factor identification module 540 identifying an illumination factor, the modulation parameter modifier module 545 may retrieve a set of one or more modulation parameters corresponding to the illumination factor from the database. In some cases, the database may associate an illumination factor with at least two different sets of one or more modulation parameters. A particular one of the sets may be chosen by the modulation parameter modifier module 545 at random or based on one or more other factors (e.g., based on a thermal performance of a light source 145, an acoustic performance of a light source 145, a flicker performance of a light source 145, and/or an SNR of a transmitted instance of the identifier). In some examples, accessing the electronically stored database may include accessing the database locally (e.g., in memory 502 maintained by the light transmitting device 505). In other examples, accessing the electronically stored database may include accessing the database remotely (e.g., over a network such as a power line network, a Wi-Fi network, or a cellular network). In some examples, the electronically stored database may correspond to a building or other venue in which the light transmitting device 505 is located, or may have a set of entries corresponding to a venue in which the light transmitting device 505 is located, and the database or set of entries may be uploaded to, downloaded by, or accessed by, the light transmitting device 505.

In some examples, the VLC transmission management module 550 may be used to apply at least one signal in which the identifier is encoded to a light source 145. The at least one signal may be applied to the light source 145 in accordance with the set of one or more modulation parameters. The at least one signal may in some cases include a current signal and/or a voltage signal and may modulate a light intensity of the light source 145 to transmit the identifier. In some examples, the at least one signal may modulate the light intensity of the light source 145 to transmit a plurality of instances of an identifier. In some examples, an instance of the identifier may be encoded in the at least one signal as a sequence of symbols. In some cases, the sequence of symbols may be based at least in part on a frequency shift keying.

The modules of the memory 502 described above may, individually or collectively, be implemented using one or more application-specific integrated circuits (ASICs) adapted to perform some or all of the applicable functions in hardware. Alternatively, the functions may be performed by one or more other processing units (or cores) such as the processor 510, on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in the memory 502, formatted to be executed by one or more general or application-specific processors such as the processor 510.

In some examples, modulation parameters may be received directly by the light transmitting device 505. For example, the modulation parameters may be stored locally in the memory 502 or other storage device and may be loaded into the light transmitting device 505 (e.g., a driver module 532) upon receiving a command from a controller or a mobile device. In other examples, the modulation parameters may be received from a remote entity such as a mobile device or a sever over a wired or wired link.

Figure 6:
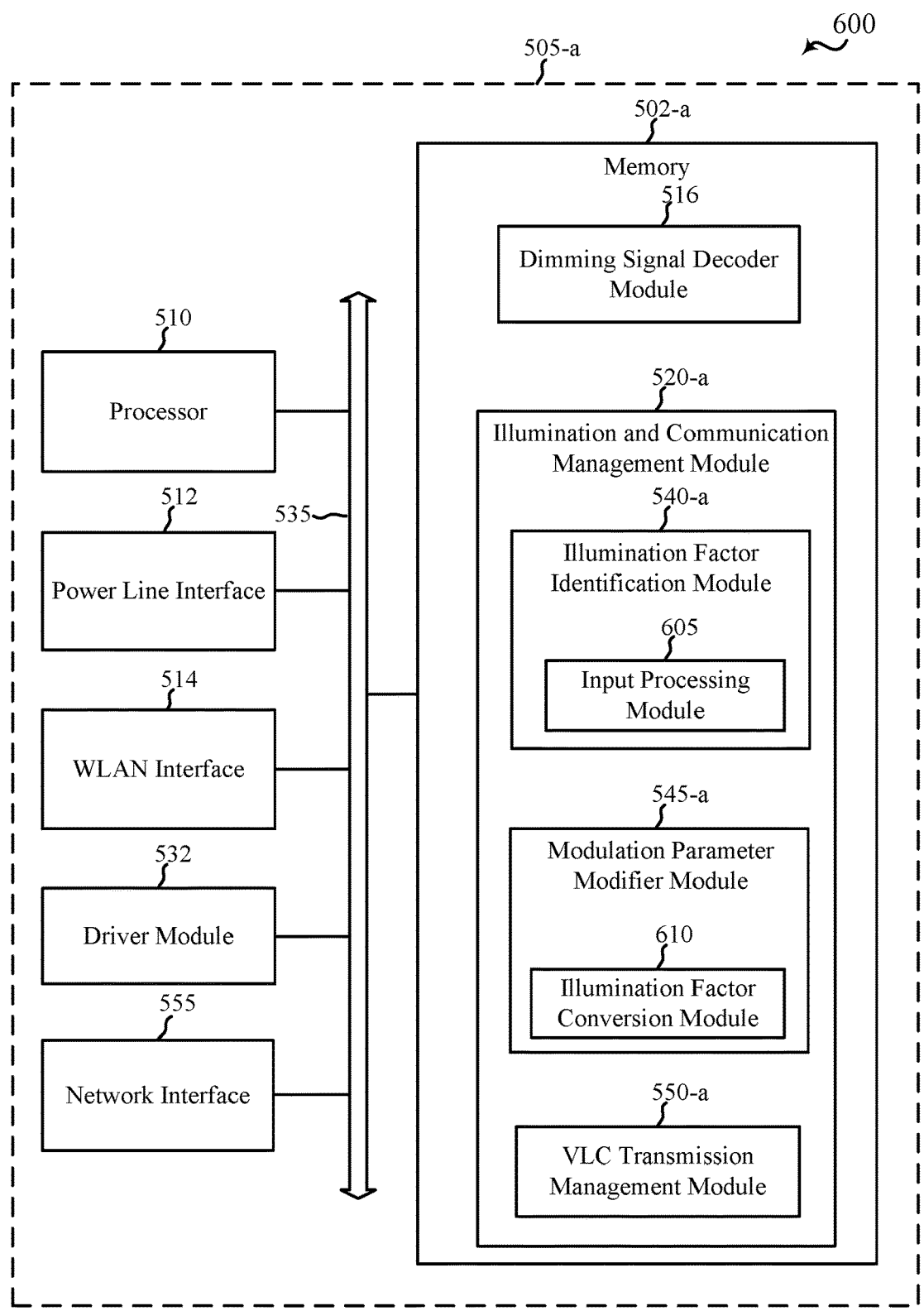
FIG. 6 illustrates another block diagram of a light transmitting device for managing illumination and communication functions of a light transmitting device, in accordance with various aspects of the present disclosure.

Referring now to FIG. 6, a block diagram 600 illustrates an example of a light transmitting device 505-a for managing illumination and communication functions of a light transmitting device 135 (e.g., a light transmitting device having aspects of one or more of the light transmitting devices 135 described with reference to FIGS. 1 and/or 2). The light transmitting device 505-a may be an example of aspects of one or more of the light transmitting devices 135 and/or aspects of one or more of the driver circuits 140 of the light transmitting devices 135. The light transmitting device 505-a may also or alternatively be an example of aspects of the light transmitting device 505 described with reference to FIG. 5. The light transmitting device 505-a may in some cases drive and/or include one or more LEDs. The light transmitting device 505-a may include a memory 502-a, a processor 510, a power line interface 512, WLAN interface 514, a driver module 532, and a network interface 555. Each of these components may be in communication with each other, directly or indirectly, over one or more buses 535. In some embodiments, some of the components may be optional.

The memory 502-a of the light transmitting device 505-a may store code for instructions (referred to as modules for example) to implement various functions related to VLC communications. For example, the memory 502-a may include a dimming signal decoder module 516 and an illumination and communication management module 520-a. The illumination and communication management module 520-a may include an illumination factor identification module 540-a, a modulation parameter modifier module 545-a, and/or a VLC transmission management module 550-a. These modules can be executed by the processor 510. In some embodiments, the modules can be executed in a dedicated hardware (e.g., a circuit or circuitry) for performing the functions described herein.

The illumination and communication management module 520-a may be used to perform various functions related to providing illumination using a light source 145 and/or modulating a light intensity of the light source 145 for VLC. In some examples, the illumination and communication management module 520-a may be an example of the illumination and communication management module 520 described with reference to FIG. 5.

In some examples, the illumination factor identification module 540-a may be an example of the illumination factor identification module 540 described with reference to FIG. 5. The illumination factor identification module 540-a may be used to identify an illumination factor associated with a light source 145. The illumination factor may in some cases include a percentage of dimness. In some examples, the illumination factor identification module 540-*a* may include an input processing module 605. In some examples, the input processing module 605 may be used to receive and process input identifying the illumination factor. The input may be received, for example, from a light switch located at the light source or on a wall, from a controller 105 (e.g., a desktop computer or wall-mounted controller), or from a mobile device 115 (e.g., a mobile phone or tablet computer).

In some examples, the modulation parameter modifier module 545-*a* may be an example of the modulation parameter modifier module 545 described with reference to FIG. 5. The modulation parameter modifier module 545-*a* may be used to modify a set of one or more modulation parameters for transmitting an identifier (e.g., an identifier of a light transmitting device 135) using VLC. The set of one or more modulation parameters may be modified based at least in part on the illumination factor identified by the illumination factor identification module 540-*a*.

In some examples, the modulation parameter modifier module 545-*a* may include an illumination factor conversion module 610. The illumination factor conversion module 610 may be used to convert an illumination factor identified by the illumination factor identification module 540-*a* to a total light output. The modulation parameter modifier module 545-*a* may then modify a set of one or more modulation parameters based at least in part on the total light output. In some cases, the total light output may be expressed in lumens. The total light output may also or alternatively be expressed as a function of current and/or voltage.

In some examples, the modulation parameter modifier module 545-*a* may be used to alternatively or additionally modify the set of one or more modulation parameters based at least in part on a thermal performance of the light source 145, an acoustic performance of the light source 145, a flicker performance of the light source 145, and/or an SNR of a transmitted instance of the identifier.

In some examples, the set of one or more modulation parameters may include at least one of a pulse duty cycle, a pulse duration, a pulse spacing, a DC bias, a pulse amplitude, and/or a pulse slope. In some examples, the pulse slope may follow a linear function, a piece-wise linear Gaussian function, a raised cosine function, a polynomial function, or an exponential function. In some examples, each of the modulation parameters may be expressed in units of amperes, volts, or lumens.

Further examples of the modification(s) performed by the modulation parameter modifier module 545-*a* are described with reference to FIGS. 3A and 3B.

In some examples, the modulation parameter modifier module 545-*a* may modify the set of one or more modulation parameters by accessing an electronically stored database that associates illumination factors with modulation parameters. Upon the illumination factor identification module 540-*a* identifying an illumination factor, the modulation parameter modifier module 545-*a* may retrieve a set of one or more modulation parameters corresponding to the illumination factor from the database. In some cases, the database may associate an illumination factor with at least two different sets of one or more modulation parameters. A particular one of the sets may be chosen by the modulation parameter modifier module 545-*a* at random or based on one or more other factors (e.g., based on a thermal performance of a light source 145, an acoustic performance of a light source 145, a flicker performance of the light source 145, and/or an SNR of a transmitted instance of the identifier). In some examples, accessing the electronically stored database may include accessing the database locally (e.g., in memory 502-*a* maintained by the light transmitting device 505-*a*). In other examples, accessing the electronically stored database may include accessing the database remotely (e.g., over a network such as a power line network, a Wi-Fi network, or a cellular network). In some examples, the electronically stored database may correspond to a building or other venue in which the light transmitting device 505-*a* is located, or may have a set of entries corresponding to a venue in which the light transmitting device 505-*a* is located, and the database or set of entries may be uploaded to, downloaded by, or accessed by, the light transmitting device 505-*a*.

In some examples, the VLC transmission management module 550-*a* may be an example of the VLC transmission management module 550 described with reference to FIG. 5. The VLC transmission management module 550-*a* may be used to apply at least one signal in which the identifier is encoded to a light source 145. The at least one signal may be applied to the light source 145 in accordance with the set of one or more modulation parameters. The at least one signal may in some cases include a current signal and/or a voltage signal and may modulate a light intensity of the light source 145 to transmit the identifier. In some examples, the at least one signal may modulate the light intensity of the light source 145 to transmit a plurality of instances of an identifier. In some examples, an instance of the identifier may be encoded in the at least one signal as a sequence of symbols. In some cases, the sequence of symbols may be based at least in part on a frequency shift keying.

The modules of the memory 502-*a* described above may, individually or collectively, be implemented using one or more ASICs adapted to perform some or all of the applicable functions in hardware. Alternatively, the functions may be performed by one or more other processing units (or cores) such as the processor 510, on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in the memory 502-*a*, formatted to be executed by one or more general or application-specific processors such as the processor 510.

Figure 7:
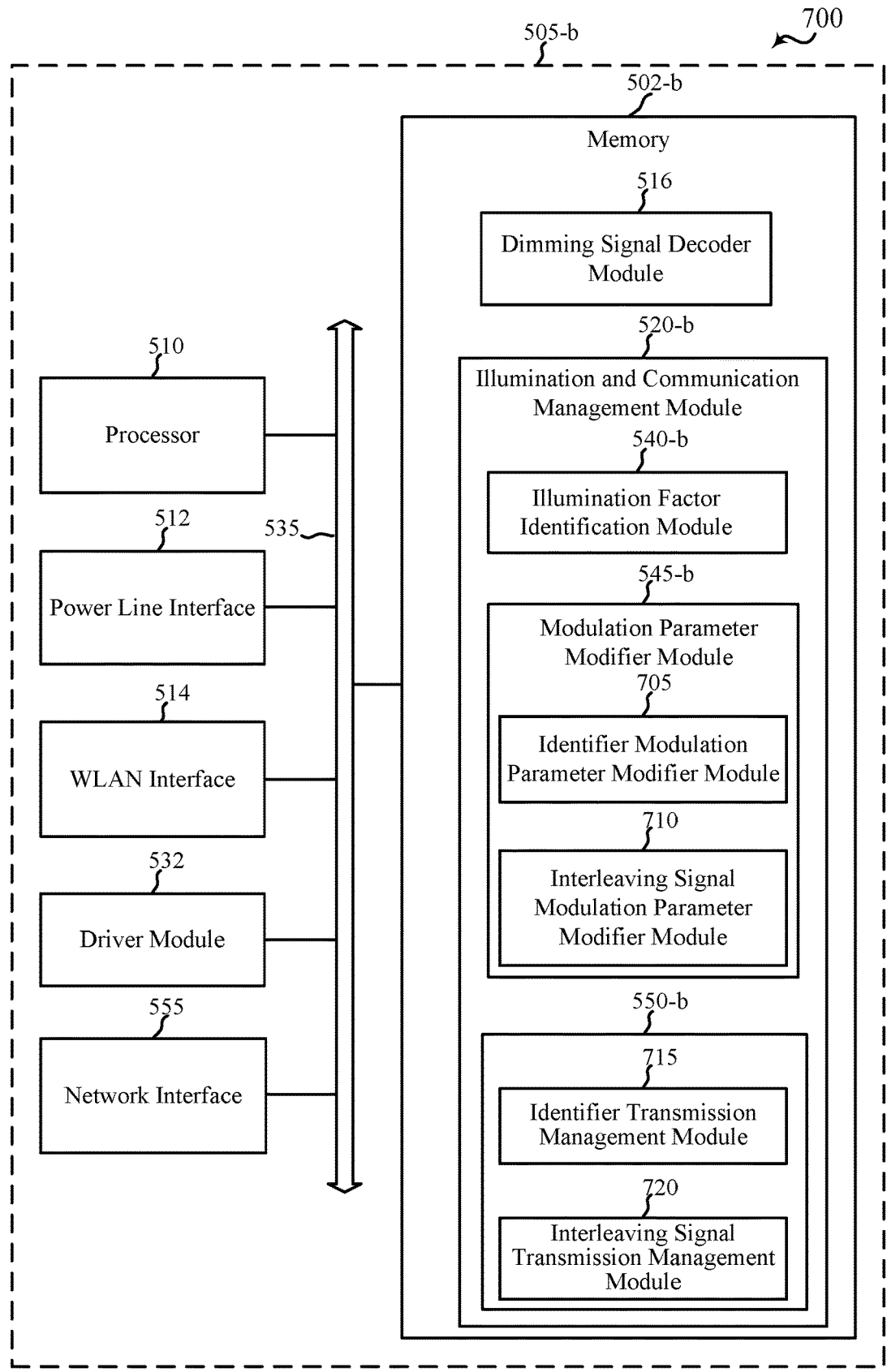
FIG. 7 illustrates another block diagram of a light transmitting device for managing illumination and communication functions of a light transmitting device, in accordance with various aspects of the present disclosure.

Referring now to FIG. 7, a block diagram 700 illustrates an example of a light transmitting device 505-*b* for managing illumination and communication functions of a light transmitting device 135 (e.g., a light transmitting device having aspects of one or more of the light transmitting devices 135 described with reference to FIGS. 1 and/or 2). The light transmitting device 505-*b* may be an example of aspects of one or more of the light transmitting devices 135 and/or aspects of one or more of the driver circuits 140 of the light transmitting devices 135. The light transmitting device 505-*b* may also or alternatively be an example of aspects of one or more of the light transmitting devices 505 described with reference to FIGS. 5 and/or 6. The light transmitting device 505-*b* may in some cases drive and/or include one or more LEDs. The light transmitting device 505-*b* may include a memory 502-*b*, a processor 510, a power line interface 512, WLAN interface 514, a driver module 532, and a network interface 555. Each of these components may be in communication with each other, directly or indirectly, over one or more buses 535. In some embodiments, some of the components may be optional.

The memory 502-*b* of the device may store code for instructions (referred to as modules for example) to implement various functions related to VLC communications. For example, the memory 502-*b* may include a dimming signal decoder module 516 and an illumination and communication management module 520-*b*. The illumination and communication management module 520-*b* may include an illumination factor identification module 540-*b*, a modulation parameter modifier module 545-*b*, and/or a VLC transmission management module 550-*b*. These modules can be executed by the processor 510. In some embodiments, the modules can be executed in a dedicated hardware (e.g., a circuit or circuitry) for performing the functions described herein.

The illumination and communication management module 520-*b* may be used to perform various functions related to providing illumination using a light source 145 and/or modulating a light intensity of the light source 145 for VLC. In some examples, the illumination and communication management module 520-*b* may be an example of the illumination and communication management module 520 described with reference to FIGS. 5 and/or 6. In some examples, the illumination and communication management module 520-*b* may include an illumination factor identification module 540-*b*, a modulation parameter modifier module 545-*b*, and/or a VLC transmission management module 550-*b*. Each of these components may be in communication with each other.

In some examples, the illumination factor identification module 540-*b* may be an example of the illumination factor identification module 540 described with reference to FIGS. 5 and/or 6. In some examples, the illumination factor identification module 540-*b* may be used to identify an illumination factor associated with a light source 145. The illumination factor may in some cases include a percentage of dimness.

In some examples, the modulation parameter modifier module 545-*b* may be an example of the modulation parameter modifier module 545 described with reference to FIGS. 5 and/or 6. In some examples, the modulation parameter modifier module 545-*b* may include an identifier modulation parameter modifier module 705 and/or an interleaving signal modulation parameter modifier module 710.

The identifier modulation parameter modifier module 705 may be used to modify a first set of one or more modulation parameters for transmitting an identifier (e.g., an identifier of a light transmitting device 135) using VLC. The first set of one or more modulation parameters may be modified based at least in part on the illumination factor identified by the illumination factor identification module 540-*b*.

In some examples, modifying the first set of one or more modulation parameters may include converting an illumination factor identified by the modulation parameter modifier module 545-*b* to a total light output, and modifying the set of one or more modulation parameters based at least in part on the total light output. In some cases, the total light output may be expressed in lumens. The total light output may also or alternatively be expressed as a function of current and/or voltage.

In some examples, the identifier modulation parameter modifier module 705 may be used to alternatively or additionally modify the first set of one or more modulation parameters based at least in part on a thermal performance of the light source 145, an acoustic performance of the light source 145, a flicker performance of the light source 145, and/or an SNR of a transmitted instance of the identifier.

In some examples, the first set of one or more modulation parameters may include at least one of a pulse duty cycle, a pulse duration, a pulse spacing, a DC bias, a pulse amplitude, and/or a pulse slope. In some examples, the pulse slope may follow a linear function, a piece-wise linear Gaussian function, a raised cosine function, a polynomial function, or an exponential function. In some examples, each of the modulation parameters may be expressed in units of amperes, volts, or lumens.

Further examples of the modification(s) performed by the identifier modulation parameter modifier module 705 are described with reference to FIGS. 3A and 3B.

In some examples, the identifier modulation parameter modifier module 705 may modify the first set of one or more modulation parameters by accessing an electronically stored database that associates illumination factors with modulation parameters. Upon the illumination factor identification module 540-*b* identifying an illumination factor, the identifier modulation parameter modifier module 705 may retrieve a first set of one or more modulation parameters corresponding to the illumination factor from the database. In some cases, the database may associate an illumination factor with at least two different sets of one or more modulation parameters. A particular one of the sets may be chosen by the identifier modulation parameter modifier module 705 at random or based on one or more other factors (e.g., based on a thermal performance of a light source 145, an acoustic performance of a light source 145, a flicker performance of the light source 145, and/or an SNR of a transmitted instance of the identifier). In some examples, accessing the electronically stored database may include accessing the database locally (e.g., in memory 502-*b* maintained by the light transmitting device 505-*b*). In other examples, accessing the electronically stored database may include accessing the database remotely (e.g., over a network such as a power line network, a Wi-Fi network, or a cellular network). In some examples, the electronically stored database may correspond to a building or other venue in which the light transmitting device 505-*b* is located, or may have a set of entries corresponding to a venue in which the light transmitting device 505-*b* is located, and the database or set of entries may be uploaded to, downloaded by, or accessed by, the light transmitting device 505-*b*.

In some examples, the interleaving signal modulation parameter modifier module 710 may be used to modify a second set of one or more modulation parameters for transmitting an interleaving signal. In some examples, the second set of one or more modulation parameters may differ from the first set of one or more modulation parameters. In some configurations, the interleaving signal may have a constant current. In other configurations, the interleaving signal may include pulses having a fixed frequency.

In some examples, the second set of one or more modulation parameters may be modified based at least in part on an identifier, a first set of one or more modulation parameters, an illumination factor, a thermal performance of a light source 145, an acoustic performance of a light source 145, and/or a flicker performance of a light source 145. For example, the second set of one or more modulation parameters may be modified to match an average light intensity level of a transmitted instance of the interleaving signal to an average light intensity level of a transmitted instance of the identifier (e.g., to reduce flicker of the light source 145).

Further examples of the modification(s) performed by the modulation parameter modifier module 545-*b* are described in further detail with reference to FIGS. 4A and 4B.

In some examples, the interleaving signal modulation parameter modifier module 710 may modify the second set of one or more modulation parameters by accessing an electronically stored database that associates sets of modulation parameters for transmitting interleaving signals with sets of modulation parameters for transmitting identifiers. Upon the identifier modulation parameter modifier module 705 modifying the first set of one or more modulation parameters, the interleaving signal modulation parameter modifier module 710 may use an index associated with the first set of one or more modulation parameter to retrieve, from the same or different database, a second set of one or more modulation parameters for transmitting an interleaving signal. In some cases, the database may associate the index with at least two different sets of one or more modulation parameters. A particular one of the sets may be chosen by the interleaving signal modulation parameter modifier module 710 at random or based on one or more other factors (e.g., based on an identifier, a first set of one or more modulation parameters, an illumination factor, a thermal performance of a light source 145, an acoustic performance of a light source 145, and/or a flicker performance of a light source 145).

In some examples, the VLC transmission management module 550-*b* may be an example of the VLC transmission management module 550 described with reference to FIGS. 5 and/or 6. The VLC transmission management module 550-*b* may be used to apply at least one signal in which an identifier is encoded to a light source 145, and alternately apply the at least one signal to the light source 145. In some examples, the VLC transmission management module 550-*b* may include an identifier transmission management module 715 and/or an interleaving signal transmission management module 720. The identifier transmission management module 715 may be used to apply the at least one signal in which the identifier is encoded to the light source 145, in accordance with the first set of one or more modulation parameters, and the interleaving signal transmission management module 720 may be used to apply the at least one signal to the light source 145 in accordance with the second set of one or more modulation parameters. The at least one signal may in some cases include a current signal and/or a voltage signal and may modulate a light intensity of the light source 145 to transmit a plurality of instances of the identifier interspersed with a plurality of instances of the interleaving signal. In some examples, an instance of the identifier may be encoded in the at least one signal as a sequence of symbols. In some cases, the sequence of symbols may be based at least in part on a frequency shift keying.

The modules of the memory 502-*b* may, individually or collectively, be implemented using one or more ASICs adapted to perform some or all of the applicable functions in hardware. Alternatively, the functions may be performed by one or more other processing units (or cores) such as the processor 510, on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in the memory 502-*b*, formatted to be executed by one or more general or application-specific processors such as the processor 510.

In some examples, aspects of the light transmitting devices 505 described with reference to FIGS. 5, 6, and/or 7 may be combined.

Figure 8:
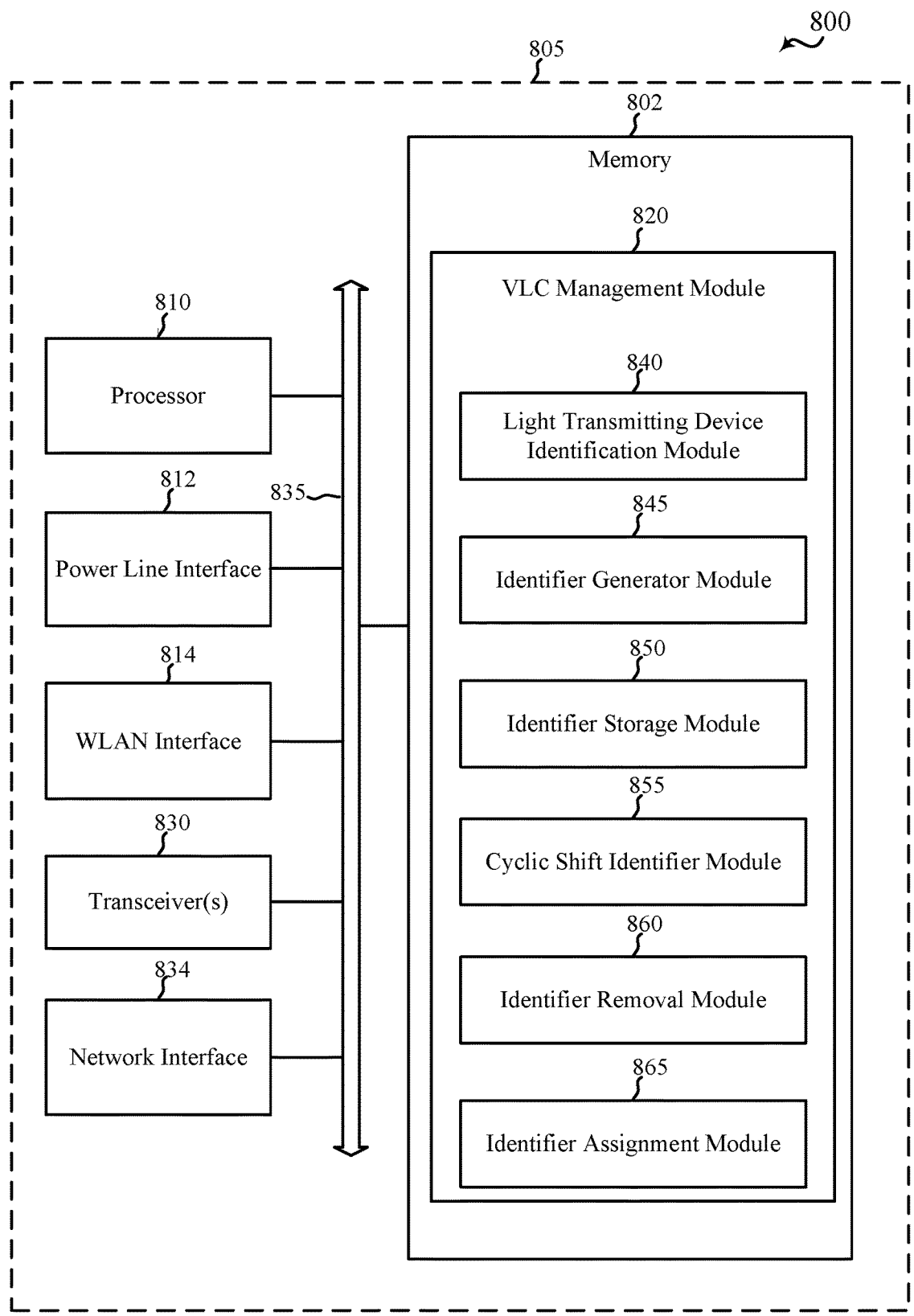
FIG. 8 illustrates a block diagram of a controller for generating identifiers (e.g., identifiers of light transmitting devices) to transmit using VLC, in accordance with various aspects of the present disclosure.

Referring now to FIG. 8, a block diagram 800 illustrates an example of a controller 805 for generating identifiers (e.g., identifiers of light transmitting devices) to transmit using VLC, in accordance with various aspects of the present disclosure. The controller 805 may be an example of aspects of one or more of the controllers 105 described with reference to FIGS. 1 and/or 2. The controller 805 may include a memory 802, a processor 810, a power line interface 812, WLAN interface 814, transceiver(s) 830, and a network interface 834. Each of these components may be in communication with each other, directly or indirectly, over one or more buses 835. In some embodiments, some of the components may be optional.

In some examples, the power line interface 812 can be a receiver (e.g., a power line receiver), a transmitter (e.g., a power line transmitter), or a transceiver (e.g., a power line transceiver). Similarly, the WLAN interface 814 can be a receiver (e.g., a WLAN receiver), a transmitter (e.g., a WLAN transmitter), or a transceiver (e.g., a WLAN transceiver). The controller 805 may also include alternate and/or additional interfaces modules for communications with other networks such as a WWAN (e.g., a cellular network such as an LTE/LTE-A), a Bluetooth (BT), and/or a BT Low Energy (BTLE).

The transceiver(s) 830 may be used, for example, to transmit identifiers to each of a number of light transmitting devices 135. The transceiver(s) 830 may also be used, for example, to transmit the same or different illumination factors to the light transmitting devices 135, to transmit other commands and/or control signals to the light transmitting devices 135, or to transmit status information to one or more mobile devices 115.

The memory 802 of the controller 805 may store code for instructions (referred to as modules for example) to implement various functions related to VLC communications. For example, the memory 802 may include a VLC management module 820. The VLC management module 820 may be used to perform various functions related to the transmission of VLC signals from a number of light transmitting devices 135. In some examples, the VLC management module 820 may include a light transmitting device identification module 840, an identifier generator module 845, an identifier storage module 850, a cyclic shift identifier module 855, an identifier removal module 860, and/or an identifier assignment module 865. These modules can be executed by the processor 810. In some embodiments, the modules can be executed in a dedicated hardware (e.g., a circuit or circuitry) for performing the functions described herein.

In some examples, the light transmitting device identification module 840 may be used to identify a number, K, of light transmitting devices 135 (e.g., a number of light transmitting devices 135 including a number of respective light sources 145, each light source 145 of which may include, for example, a number of LEDs).

In some examples, the identifier generator module 845 may be used to generate a plurality of identifiers based at least in part on the identified number of light transmitting devices 135. The identifiers may in some cases include sequences of symbols, which symbols may each represent one or more bits, and which symbols may be based on a frequency shift keying.

In some examples, generating the plurality of identifiers may include selecting an identifier length and an alphabet for generating the plurality of identifiers. The identifier length and alphabet may be selected based at least in part on a number of characters in the alphabet and the identified number of light transmitting devices 135. The plurality of identifiers may be generated as different combinations of alphabet characters having the identifier length. In some cases, the identifier length, N, and alphabet size, $N\_s$, may be selected such that a plurality of identifiers equal to or greater than the number, K, of light transmitting devices 135 in the plurality of light transmitting devices 135 is expected (or ensured) to remain following the identifier removal operation(s) performed by the identifier removal module 860 (e.g., such that $N\_s^{\wedge}N > K$).

In some examples, the identifier storage module 850 may be used to store the generated identifiers (e.g., in electronic storage, such as the memory 802).

In some examples, the cyclic shift identifier module 855 may be used to determine a plurality of cyclic shifts for each identifier of the plurality of identifiers.

In some examples, the identifier removal module 860 may be used to remove identifiers from the plurality of identifiers that match the identified cyclic shifts.

In some examples, the identifier assignment module 865 may be used to assign each of the number of light transmitting devices 135 a unique identifier from among the identifiers that remain in the plurality of identifiers after the identifier removal module 860 removes the identifiers that match the identified cyclic shifts. In some cases, assigning a light transmitting device 135 a unique identifier may include transmitting the unique identifier to the light transmitting device 135. In some cases, assigning a light transmitting device 135 a unique identifier may include transmitting an index to the light transmitting device 135. The index may indicate which of a plurality of identifiers stored at the light transmitting device is to be used as the unique identifier of the light transmitting device 135.

The removal of identifiers that are cyclic shifts of other identifiers can speed the rate at which an identifier received at a mobile device 115 and/or other device by means of a VLC transmission is decoded. For example, when an identifier is received at the mobile device 115 and/or other device using a rolling shutter image sensor, a large number of symbol and/or bit erasures may occur. That is, the mobile device 115 and/or other device may only receive some of the symbols and/or bits of an identifier. When the mobile device 115 and/or other device does not receive a number of synchronization symbols and/or bits, the mobile device 115 and/or other device may be unable to determine whether it has received symbols and/or bits of one instance or multiple instances of an identifier (e.g., a last part of a first instance of the identifier followed by a first part of a second instance of the identifier). By removing cyclic shifts of identifiers from a list of identifiers, a received set of symbols and/or bits will match fewer identifiers in the list. If a sufficient number of symbols and/or bits is received by the mobile device 115 and/or other device, the received set of symbols and/or bits may match only one identifier in the list.

The components of the memory 802 may, individually or collectively, be implemented using one or more ASICs adapted to perform some or all of the applicable functions in hardware. Alternatively, the functions may be performed by one or more other processing units (or cores) such as the processor 810, on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in the memory 802, formatted to be executed by one or more general or application-specific processors such as the processor 810.

Figure 9:
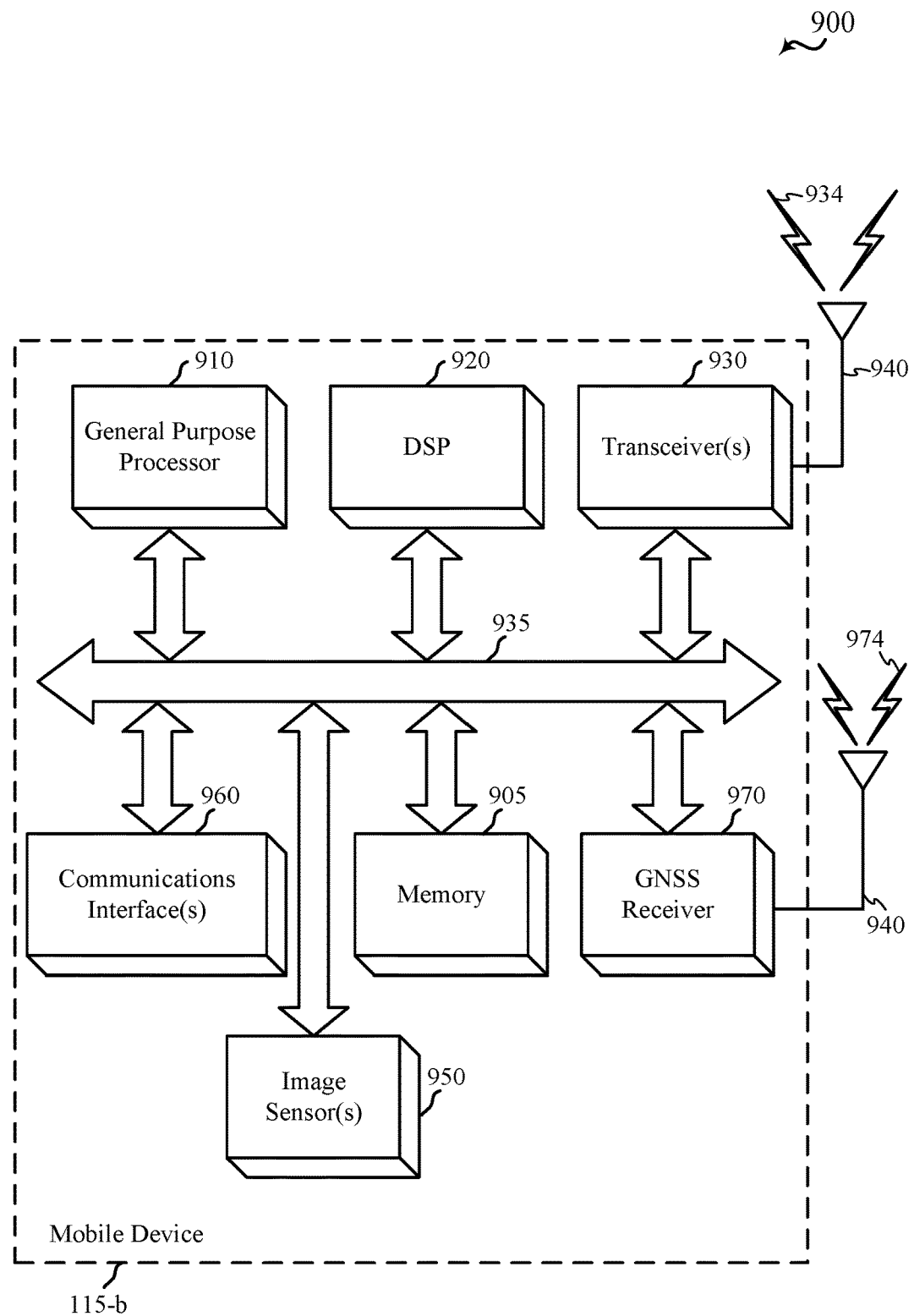
FIG. 9 illustrates a block diagram of an example of a mobile device for wireless communication using VLC, in accordance with various aspects of the present disclosure.

FIG. 9 is a block diagram 900 illustrating an example of a mobile device 115-*b* capable of receiving VLC transmissions from a number of light transmitting devices, in accordance with various aspects of the present disclosure. The mobile device 115-*b* may be an example of aspects of one or more of the mobile devices 115 and/or 115-*a* described with reference to FIGS. 1 and/or 2. The mobile device 115-*b* may have any of various configurations and may in some cases be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. In some embodiments, the mobile device 115-*b* may have an internal power supply (not shown), such as a small battery, to facilitate mobile operation. The mobile device 115-*b* may include memory 905, a general purpose processor 910, and a digital signal processor (DSP) 920, at least one wireless transceiver (represented by wireless transceiver(s) 930), one or more antennas 940, image sensor(s) 950, communications interface(s) 960, and/or a Global Navigation Satellite System (GNSS) receiver 970. Each of these components may be in communication with each other, directly or indirectly, over one or more buses 935. In some embodiments, some of the components may be optional.

The memory 905 may be used to store instructions to perform various functionalities related to VLC communications described with reference to FIGS. 1, 2, 5, 6, and/or 8 and the general purpose processor 910 and the DSP 920 may be used to execute the instructions. As described herein, the mobile device 115-*b* may perform various functions related to the receipt of VLC signals from a number of light transmitting devices 135. In some examples, the mobile device 115-*b* may include various circuitries, modules, blocks, or components to perform different functionalities. For example, the mobile device 115-*b* (or instructions on the memory 905) may include a VLC management block 1720, which may include an illumination factor identification block 1740, a signal decoder block 1750, and/or navigation block 1760 as illustrated as functionality blocks in FIG. 17. In some examples, the signal decoder block 1750 may include an identifier decoder block 1752 and/or an interleaving signal decoder block 1754 as illustrated as functionality blocks in FIG. 17.

The illumination factor identification module stored in the memory 905, in conjunction with the general purpose processor 910 and/or DSP 920, may be used to identify an illumination factor associated with a light source 145 to be provided to light transmitting devices 135 of FIG. 1 and/or FIG. 2. The light source 145 may in some cases be or include one or more LEDs. The illumination factor may in some cases include a percentage of dimness.

The signal decoder module may be used to decode one or more signals received using VLC. The signal may be an identifier of the light source. In some examples, the mobile device 115-*b* may receive at least one signal comprising the identifier and the identifier decoder of the mobile device 115-*b* may be used to decode the at least one signal to obtain the identifier. In other examples, the mobile device 115-*b* may receive an interleaving signal, where a plurality of instances of the identifier is interspersed with a plurality of instances of the interleaving signal. In these cases, the interleaving signal decoder circuit (or instructions stored in memory 905) in conjunction with the processor 910 and/or DSP 920 may be used to decode the interleaving signal to obtain the identifier.

The modules of the memory 905 may, individually or collectively, be implemented using one or more ASICs adapted to perform some or all of the applicable functions in hardware. Alternatively, the functions may be performed by one or more other processing units (or cores) such as the processors 910, 920, on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in the memory 905, formatted to be executed by one or more general or application-specific processors.

The memory 905 may include random access memory (RAM) and/or read-only memory (ROM). The memory 905 may store computer-readable, computer-executable code containing instructions that are configured to, when executed, cause the processor 910 and/or DSP 920 to perform various functions described herein, such as navigating in response to VLC transmissions received from a number of light transmitting devices 135 and/or performing the functions of a controller such as the controller 105 described with reference to FIGS. 1, 8, and/or 11. Alternatively, the code may not be directly executable by the processor 910, and/or the DSP 920 but be configured to cause the mobile device 115-b (e.g., when compiled and executed) to perform various of the functions described herein.

The general purpose processor 910 or DSP 920 may include an intelligent hardware device, e.g., a CPU, such as an ARM® based processor or those made by Intel® Corporation or AMD®, a microcontroller, an ASIC, etc. The general purpose processor 910, and/or DSP 920 may process information received via the wireless transceiver(s) 930 or the GNSS receiver 970 of the mobile device 115-b, as well as information to be sent via the wireless transceiver(s) 930 of the mobile device 115-b. The processor 910, and/or DSP 920, may handle, alone or in connection with the image sensor(s) 950, the GNSS receiver 970, and memory 905, various aspects pertaining to navigation based at least in part on VLC transmissions received from a number of light transmitting devices 135.

The wireless transceiver(s) 930 may include a modem configured to modulate packets and provide the modulated packets to the antenna(s) 940 for transmission, and to demodulate packets received from the antenna(s) 940. The wireless transceiver(s) 930 may in some cases be implemented as one or more separate transmitters and a receivers. The wireless transceiver(s) 930 may be configured to communicate uni-directionally or bi-directionally, via the antenna(s) 940, with one or more other entities, such as an access point or base station of a wireless communications network, one or more controllers 105, 805 for a number of light transmitting devices 135, one or more other mobile devices 115, and/or a number of light transmitting devices 135. While the mobile device 115-b includes only two antennas 940 in FIG. 9, there may be embodiments in which the mobile device 115-b may include multiple antennas (e.g., antenna array).

The image sensor(s) 950 may in some cases include a complimentary metal-oxide semiconductor (CMOS) image sensor, and in some cases may be configured as a rolling shutter image sensor. The image sensor(s) 950 may be used to capture images of light transmitting devices 135 and/or VLC transmissions from light transmitting devices 135.

The memory 905 may also store processor-executable code for instructions to implement a navigation function based on VLC transmissions 934, 974 received by the wireless transceiver(s) 930 and/or the GNSS receiver 970 from a number of light transmitting devices 135. Each of the VLC transmissions may include an identifier of a light transmitting device 135. The identifier(s) may be used by the mobile device 115-b to determine a location of each light transmitting device 135 for which an identifier is received. Based at least in part on the locations of one or more light transmitting devices 135 with respect to the mobile device 115-b, the mobile device 115-b may determine a location and/or orientation of the mobile device 115-b. In some cases, functionality of the mobile device 115-b may be implemented as a computer program product and/or as one or more controller elements of the processor 910 and/or DSP 920. The communications interface(s) 960 of the mobile device 115-b may be used to perform functions related to communications with one or more networks, a network core, and/or other mobile devices. The communications interface (s) 960 may be referred to as a network interface, a wireless interface, or any other terms used in the art.

Figure 10:
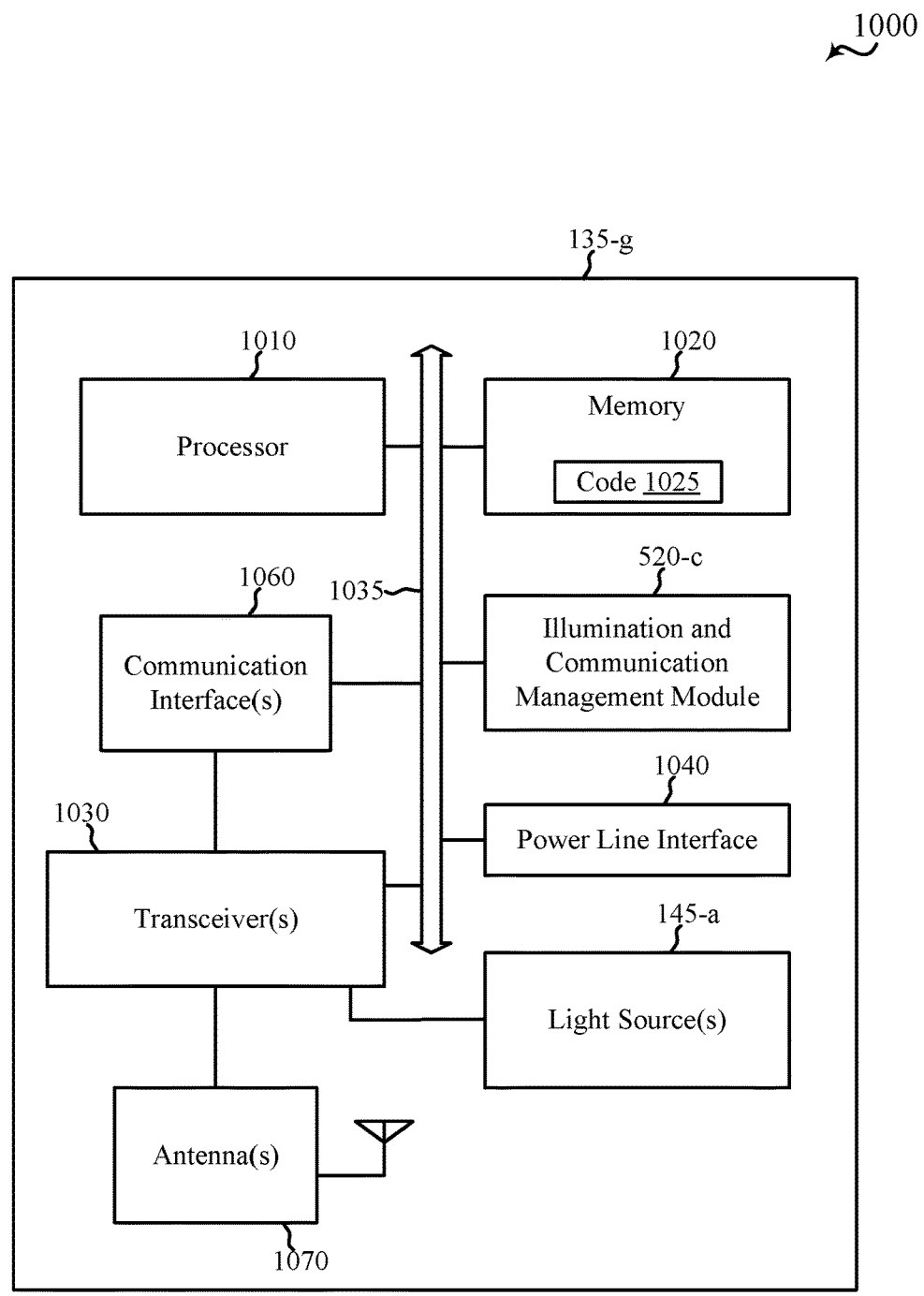
FIG. 10 illustrates a block diagram of a light transmitting device for transmitting an identifier using VLC, in accordance with various aspects of the present disclosure.

FIG. 10 is a block diagram 1000 illustrating an example of a light transmitting device 135-g for transmitting an identifier using VLC. The light transmitting device 135-g may be an example of aspects of one or more of the light transmitting devices 135 described with reference to FIGS. 1 and/or 2 or the light transmitting device 505 described with reference to FIGS. 5-7.

The light transmitting device 135-g may include a processor 1010, a memory 1020, an illumination and communication management module 520-c, one or more transceiver(s) 1030, power line interface 1040, communication interface(s) 1060, one or more antenna(s) 1070, and/or one or more light sources (represented by light source(s) 145-a). Each of these components may be in communication with each other, directly or indirectly, over one or more buses 1035. In some examples, part or all of the processor 1010, the memory 1020, the illumination and communication management module 520-c, and/or the transceiver(s) 1030 may function as a driver circuit 140 or intelligent ballast for the light source(s) 145-a. In some examples, the light source(s) 145-a may include one or more LEDs.

The memory 1020 may include RAM and/or ROM. The memory 1020 may store computer-readable, computer-executable code 1025 containing instructions that are configured to, when executed, cause the processor 1010 to perform various functions described herein for driving the light source(s) 145-a and/or transmitting an identifier from the light source(s) 145-a using VLC. Alternatively, the code 1025 may not be directly executable by the processor 1010 but be configured to cause the light transmitting device 135-g (e.g., when compiled and executed) to perform various of the functions described herein.

The processor 1010 may include an intelligent hardware device, e.g., a CPU, such as an ARM® based processor or those made by Intel® Corporation or AMD®, a microcontroller, an ASIC, etc. The processor 1010 may process information received through the transceiver(s) 1030 and/or configure and/or provide information to the transceiver(s) 1030. The processor 1010 may handle, alone or in connection with the illumination and communication management module 520-c, various aspects pertaining to driving one or more of the light source(s) 145-a for purposes of providing illumination and/or communicating using VLC.

In some examples, the transceiver(s) 1030 may include a driver module similar to the driver module 532 described with reference FIGS. 5 and/or 6. The driver module may generate a current signal, voltage signal, and/or other signal to provide a signal for modulating one or more of the light intensity of one or more of the light source(s) 145-a. In some examples, the transceiver(s) 1030 may include the light source 145-a. In some examples, the transceiver(s) 1030 may include a power line transmitter module and/or a WLAN transmitter module (e.g., a Wi-Fi transmitter module). The transmitter module may also include alternate and/or additional transmitter modules, such as a WWAN transmitter module (e.g., a cellular transmitter module such as an LTE/LTE-A transmitter module), a BT transmitter module, and/or a BTLE transmitter module. When included, the transmitter module may be used to transmit, for example, status information to a user interface provided by a mobile device 115 (e.g., a mobile phone or tablet computer) or controller 105 (e.g., a desktop computer or wall-mounted control pad). The status information may in some cases include a light intensity of the light source(s) 145-*a*, a thermal performance of the light source(s) 145-*a*, and/or an identifier of the light transmitting device 135-*g*. In some examples, the processor 1010 and/or illumination and communication management module 520-*c* may communicate directly with the transceiver(s) 1030. In some examples, the processor 1010 and/or illumination and communication management module 520-*c* may communicate with the transceiver(s) 1030 via one or more of communication interface(s) 1060. In some configurations, the transceiver(s) 1030 may transmit information and/or signals via the antenna(s) 1070 and/or over a power line network via the power line interface 1040.

In some examples, the transceiver(s) 1030 may include a power line receiver module and/or a WLAN receiver module (e.g., a Wi-Fi receiver module). The transceiver(s) 1030 may also include alternate and/or additional receiver modules, such as a WWAN receiver module (e.g., a cellular receiver module such as an LTE/LTE-A receiver module), a BT receiver module, and/or a BTLE receiver module. The transceiver(s) 1030 may be used to receive, for example, command and/or control signals from a light switch located at the light transmitting device 135-*g* or on a wall, or from a user interface provided by a mobile device 115 or controller 105, 805. The commands and/or control signals may in some cases include an illumination factor, such as a percentage of dimness for setting or adjusting a light intensity of one or more light source(s) 145-*a*, or an identifier of the light transmitting device 135-*g*. In some configurations, the transceiver(s) 1030 may receive information and/or signals via the antenna(s) 1070 and/or over a power line network via the power line interface 1040.

The illumination and communication management module 520-*c* may be an example of one or more aspects of the illumination and communication management module 520 described with reference to FIGS. 5, 6, and/or 7. By way of example, the illumination and communication management module 520-*c* may be a component of the light transmitting device 135-*g* in communication with some or all of the other components of the light transmitting device 135-*g* over one or more buses 1035. Alternatively, functionality of the illumination and communication management module 520-*c* may be implemented as a computer program product and/or as one or more controller elements of the processor 1010.

Some or all of the components of the light transmitting device 135-*g* may, individually or collectively, be implemented using one or more ASICs adapted to perform some or all of the applicable functions in hardware. Alternatively, some or all of the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the light transmitting device 135-*g*.

Figure 11:
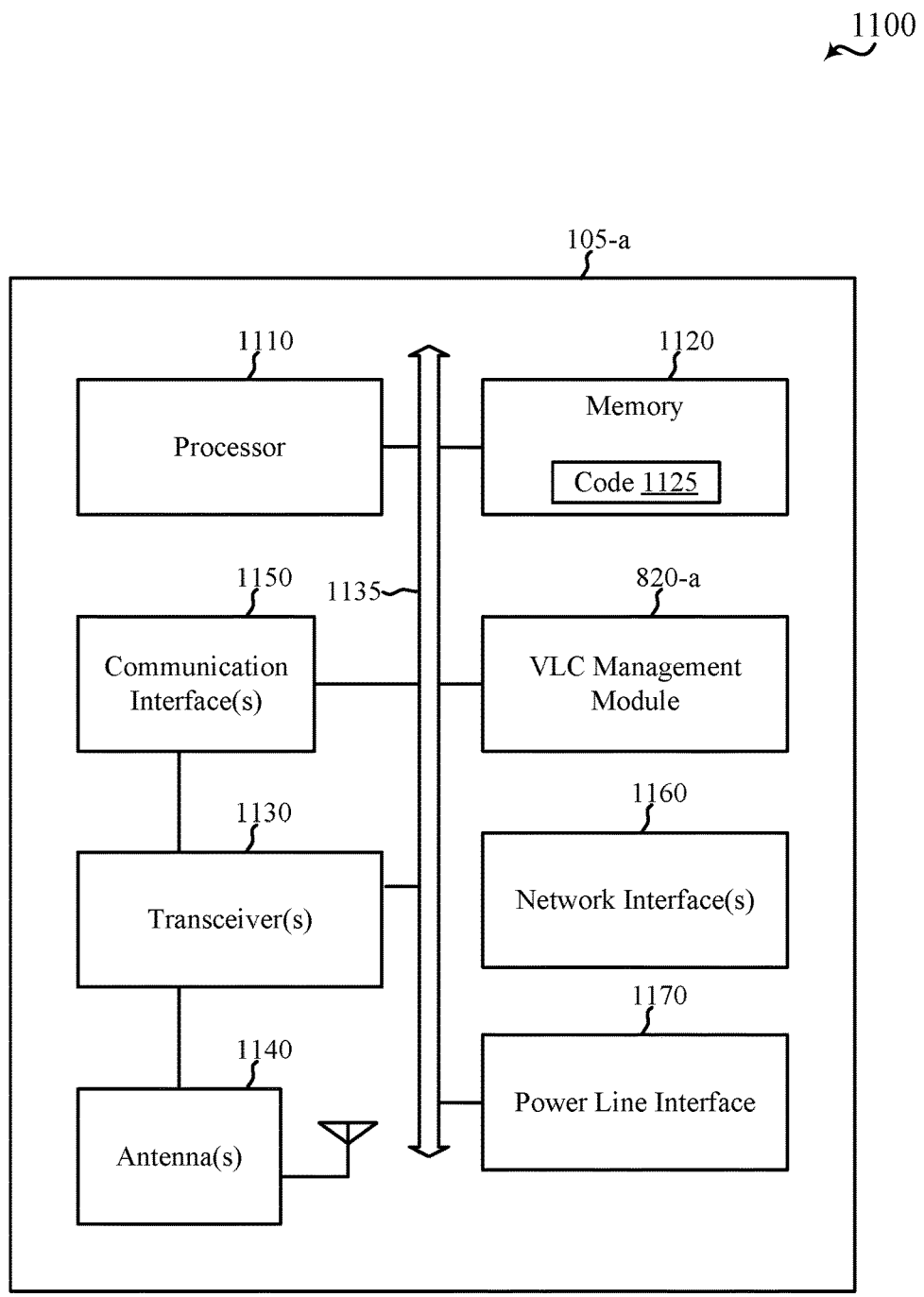
FIG. 11 illustrates a block diagram of a controller capable of managing VLC transmissions of a number of light transmitting devices, in accordance with various aspects of the present disclosure.

FIG. 11 is a block diagram 1100 illustrating an example of a controller 105-*a* capable of managing VLC transmissions of a number of light transmitting devices 135. The controller 105-*a* may be an example of aspects of the controller 105 described with reference to FIG. 1, and/or aspects of the controller 805 described with reference to FIG. 8. The controller 105-*a* may have any of various configurations and may in some cases be or include a desktop computer or wall-mounted controller.

The controller 105-*a* may include a processor 1110, a memory 1120, a VLC management module 820-*a*, at least one network interface (represented by network interface(s) 1160), power line interface 1170, at least one transceiver (represented by transceiver(s) 1130), and/or at least one antenna (represented by antenna(s) 1140). Wireless or wired network interface(s) may be used for the network interface(s) 1160. Each of these components may be in communication with each other, directly or indirectly, over one or more buses 1135.

The memory 1120 may include RAM and/or ROM. The memory 1020 may store computer-readable, computer-executable code 1125 containing instructions that are configured to, when executed, cause the processor 1110 to perform various functions described herein for managing VLC transmissions of a number of light transmitting devices 135, including the generation of a plurality of identifiers for transmission by the number of light transmitting devices 135 using VLC. Alternatively, the code 1125 may not be directly executable by the processor 1110 but be configured to cause the controller 105-*a* (e.g., when compiled and executed) to perform various of the functions described herein.

The processor 1110 may include an intelligent hardware device, e.g., a CPU, such as an ARM® based processor or those made by Intel® Corporation or AMD®, a microcontroller, an ASIC, etc. The processor 1110 may process information received through the transceiver(s) 1130, as well as information to be sent to the transmitter component of the transceiver(s) 1130. The processor 1110 may handle, alone or in connection with the VLC management module 820-*a*, various aspects pertaining to VLC management for a number of light transmitting devices 135.

The transceiver(s) 1130 may include a modem configured to modulate packets and provide the modulated packets to the antenna(s) 1140 and/or a power line interface 1170 for transmission, and to demodulate packets received from the antenna(s) 1140 and/or a power line interface 1170. The transceiver(s) 1130 may be configured to communicate uni-directionally or bi-directionally, via the antenna(s) 1140 and/or a power line interface 1170, with one or more other devices, such as one or more other controllers 105, one or more mobile devices 115, and/or one or more light transmitting devices 135. In some cases, the controller 105-*a* may be a Wi-Fi device capable of communicating with one or more other Wi-Fi capable controllers 105, mobile devices 115, and/or light transmitting devices 135. While the controller 105-*a* may include a single antenna, there may be embodiments in which the controller 105-*a* may include multiple antennas 1140. In some examples, the processor 1110 and/or VLC management module 820-*a* may communicate directly with the transceiver(s) 1130. In some examples, the processor 1110 and/or VLC management module 820-*a* may communicate with the transceiver(s) 1130 via one or more of communication interface(s) 1150.

The VLC management module 820-*a* may be an example of one or more aspects of the VLC management module 820 described with reference to FIG. 8. By way of example, the VLC management module 820-*a* may be a component of the controller 105-*a* in communication with some or all of the other components of the controller 105-*a* over one or more buses 1135. Alternatively, functionality of the VLC management module 820-*a* may be implemented as a computer program product and/or as one or more controller elements of the processor 1110.

The components of the controller 105-*a* may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the controller 105-*a*.

Figure 12:
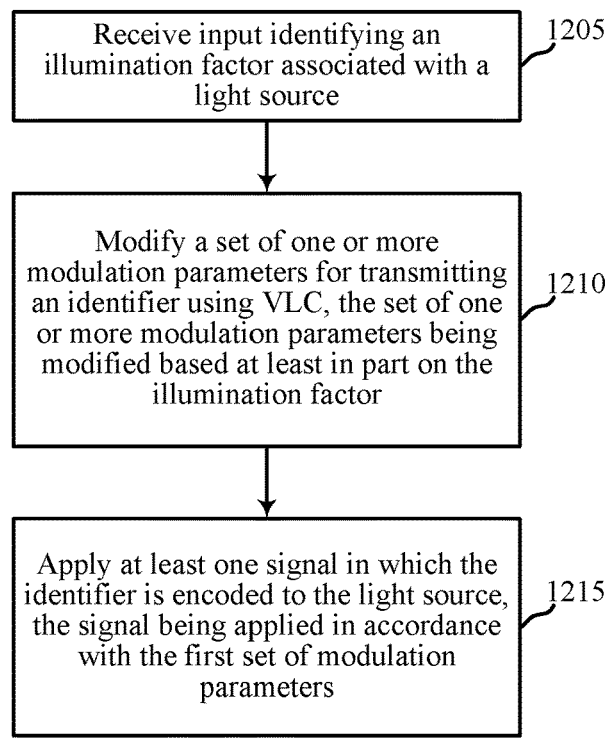
FIG. 12 is a flow chart illustrating a method for transmitting an identifier (e.g., an identifier of a light transmitting device) using VLC, in accordance with various aspects of the present disclosure.

FIG. 12 is a flow chart illustrating a method 1200 for transmitting an identifier (e.g., an identifier of a light transmitting device 135) using VLC, in accordance with various aspects of the present disclosure. For clarity, the method 1200 is described below with reference to aspects of one or more of the light transmitting devices 135 described with reference to FIGS. 1 and/or 2, and/or aspects of one or more of the light transmitting devices 505 and/or 135-*g* described with reference to FIGS. 5, 6, 7, and/or 10. In some examples, the illumination and communication management module 520 described with reference to FIGS. 5, 6, 7, and/or 10 may execute one or more sets of codes to perform the functions described below.

At block 1205, the method 1200 may include receiving input identifying an illumination factor associated with a light source 145. The light source 145 may in some cases be or include one or more LEDs. The illumination factor may in some cases include a percentage of dimness. The input may be received, for example, from a light switch located at the light source or on a wall, from a controller 105 (e.g., a desktop computer or wall-mounted controller), or from a mobile device 115 (e.g., a mobile phone or tablet computer). The operation(s) at block 1205 may be performed and/or managed using the illumination and communication management module 520 described with reference to FIGS. 5, 6, 7, and/or 10, and/or the illumination factor identification module 540 described with reference to FIGS. 5, 6, and/or 7.

At block 1210, the method 1200 may include modifying a set of one or more modulation parameters for transmitting the identifier using VLC. The set of one or more modulation parameters may be modified based at least in part on the illumination factor. In some examples, the modulation parameters may be received directly by the light source. For example, the modulation parameters may be stored locally inside the light source's memory (e.g., EEPROM) or other storage device and may be loaded into the light source (e.g., a driver) upon receiving a command. In other examples, the modulation parameters may be received from a remote entity such as a mobile device or a sever over a wired or wired link. The operation(s) at block 1210 may be performed and/or managed using the illumination and communication management module 520 described with reference to FIGS. 5, 6, 7, and/or 10, and/or the modulation parameter modifier module 545 described with reference to FIGS. 5, 6, and/or 7.

In some examples, modifying the set of one or more modulation parameters may include converting the illumination factor to a total light output, and modifying the set of one or more modulation parameters based at least in part on the total light output. In some cases, the total light output may be expressed in lumens. The total light output may also or alternatively be expressed as a function of current and/or voltage.

In some examples of the method 1200, the set of one or more modulation parameters may be alternatively or additionally modified based at least in part on a thermal performance of the light source 145, an acoustic performance of the light source 145, a flicker performance of the light source 145, and/or an SNR of a transmitted instance of the identifier.

In some examples of the method 1200, the set of one or more modulation parameters may include at least one of a pulse duty cycle, a pulse duration, a pulse spacing, a DC bias, a pulse amplitude, and/or a pulse slope. In some examples, the pulse slope may follow a linear function, a piece-wise linear Gaussian function, a raised cosine function, a polynomial function, or an exponential function. In some examples, each of the modulation parameters may be expressed in units of amperes, volts, or lumens.

Further examples of the modification(s) performed at block 1210 are described with reference to FIGS. 3A and 3B.

In some examples of the method 1200, modifying the set of one or more modulation parameters may include accessing an electronically stored database that associates illumination factors with modulation parameters. Upon identifying an illumination factor, a set of one or more modulation parameters that provide the identified illumination factor for the light source 145 may be retrieved from the database. In some cases, the database may associate an illumination factor with at least two different sets of one or more modulation parameters. A particular one of the sets may be chosen at random or based on one or more other factors (e.g., based on a thermal performance of the light source 145, an acoustic performance of the light source 145, a flicker performance of the light source 145, and/or an SNR of a transmitted instance of the identifier). In some examples, accessing the electronically stored database may include accessing the database locally (e.g., in memory maintained at a light transmitting device 135, or as part of a driver circuit 140 for a light source 145 of the light transmitting device 135). In other examples, accessing the electronically stored database may include accessing the database remotely (e.g., over a network such as a power line network, a Wi-Fi network, or a cellular network). In some examples, the electronically stored database may correspond to a building or other venue, or may have a set of entries corresponding to a venue, and the database or set of entries may be uploaded to, downloaded by, or accessed by, a driver circuit 140 of each of one or more light transmitting devices 135 in the venue.

At block 1215, the method 1200 may include applying at least one signal in which the identifier is encoded to the light source 145. The at least one signal may be applied to the light source 145 in accordance with the set of one or more modulation parameters. The at least one signal may in some cases include a current signal and/or a voltage signal and may modulate a light intensity of the light source 145 to transmit the identifier. In some examples, the at least one signal may modulate the light intensity of the light source 145 to transmit a plurality of instances of the identifier. In some examples, an instance of the identifier may be encoded in the at least one signal as a sequence of symbols. In some cases, the sequence of symbols may be based at least in part on a frequency shift keying. The operation(s) at block 1215 may be performed and/or managed using the illumination and communication management module 520 described with reference to FIGS. 5, 6, 7, and/or 10, and/or the VLC transmission management module 550 described with reference to FIGS. 5, 6, and/or 7.

Therefore, the method 1200 may be used for wireless communication. It should be noted that the method 1200 is just one implementation and that the operations of the method 1200 may be rearranged or otherwise modified such that other implementations are possible.

Figure 13:
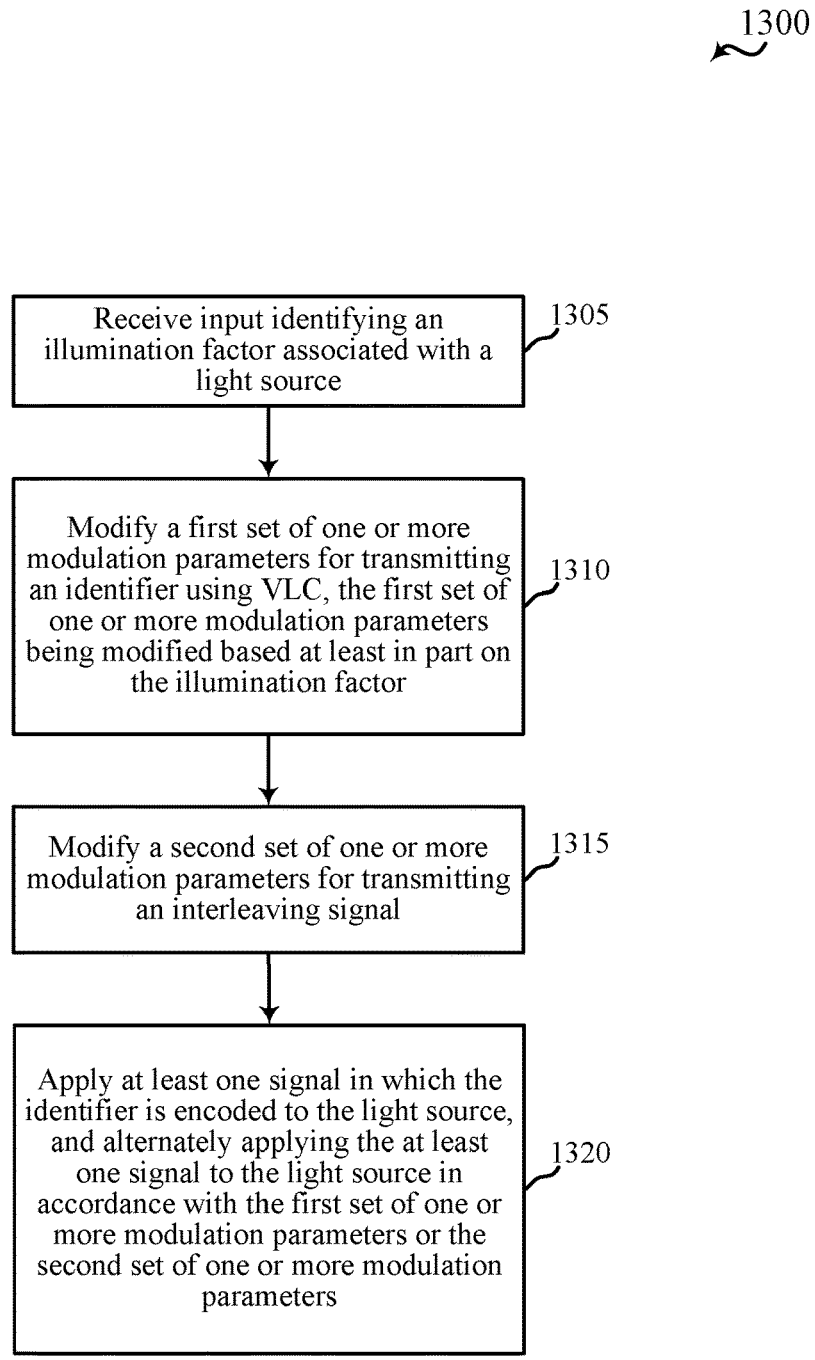
FIG. 13 is a flow chart illustrating another method for transmitting an identifier (e.g., an identifier of a light transmitting device) using VLC, in accordance with various aspects of the present disclosure.

FIG. 13 is a flow chart illustrating a method 1300 for transmitting an identifier (e.g., an identifier of a light transmitting device 135) using VLC, in accordance with various aspects of the present disclosure. For clarity, the method 1300 is described below with reference to aspects of one or more of the light transmitting devices 135 described with reference to FIGS. 1 and/or 2, and/or aspects of one or more of the light transmitting devices 505 and/or 135-g described with reference to FIGS. 5, 6, 7, and/or 10. In some examples, the illumination and communication management module 520 described with reference to FIGS. 5, 6, 7, and/or 10 may execute one or more sets of codes to perform the functions described below.

At block 1305, the method 1300 may include receiving input identifying an illumination factor associated with a light source 145. The light source 145 may in some cases be or include one or more LEDs. The illumination factor may in some cases include a percentage of dimness. The input may be received, for example, from a light switch located at the light source or on a wall, from a controller 105 (e.g., a desktop computer or wall-mounted controller), or from a mobile device 115 (e.g., a mobile phone or tablet computer). The operation(s) at block 1305 may be performed and/or managed using the illumination and communication management module 520 described with reference to FIGS. 5, 6, 7, and/or 10, and/or the illumination factor identification module 540 described with reference to FIGS. 5, 6, and/or 7.

At block 1310, the method 1300 may include modifying a first set of one or more modulation parameters for transmitting the identifier using VLC. The first set of one or more modulation parameters may be modified based at least in part on the illumination factor. The operation(s) at block 1310 may be performed and/or managed using the illumination and communication management module 520 described with reference to FIGS. 5, 6, 7, and/or 10, the modulation parameter modifier module 545 described with reference to FIGS. 5, 6, and/or 7, and/or the identifier modulation parameter modifier module 705 described with reference to FIG. 7.

In some examples, modifying the first set of one or more modulation parameters may include converting the illumination factor to a total light output, and modifying the first set of one or more modulation parameters based at least in part on the total light output. In some cases, the total light output may be expressed in lumens. The total light output may also or alternatively be expressed as a function of current and/or voltage.

In some examples of the method 1300, the first set of one or more modulation parameters may be alternatively or additionally modified based at least in part on a thermal performance of the light source 145, an acoustic performance of the light source 145, a flicker performance of the light source 145, and/or an SNR of a transmitted instance of the identifier.

In some examples of the method 1300, the first set of one or more modulation parameters may include at least one of a pulse duty cycle, a pulse duration, a pulse spacing, a DC bias, a pulse amplitude, and/or a pulse slope. In some examples, the pulse slope may follow a linear function, a piece-wise linear Gaussian function, a raised cosine function, a polynomial function, or an exponential function. In some examples, each of the modulation parameters may be expressed in units of amperes, volts, or lumens.

Further examples of the modification(s) performed at block 1310 are described with reference to FIGS. 3A and 3B.

In some examples of the method 1300, modifying the first set of one or more modulation parameters may include accessing an electronically stored database that associates illumination factors with modulation parameters. Upon identifying an illumination factor, a first set of one or more modulation parameters that provide the identified illumination factor for the light source 145 may be retrieved from the database. In some cases, the database may associate an illumination factor with at least two different sets of one or more modulation parameters. A particular one of the sets may be chosen at random or based on one or more other factors (e.g., based on a thermal performance of the light source 145, an acoustic performance of the light source 145, a flicker performance of the light source 145, and/or an SNR of a transmitted instance of the identifier). In some examples, accessing the electronically stored database may include accessing the database locally (e.g., in memory maintained at a light transmitting device 135, or as part of a driver circuit 140 for a light source 145 of the light transmitting device 135). In other examples, accessing the electronically stored database may include accessing the database remotely (e.g., over a network such as a power line network, a Wi-Fi network, or a cellular network). In some examples, the electronically stored database may correspond to a building or other venue, or may have a set of entries corresponding to a venue, and the database or set of entries may be uploaded to, downloaded by, or accessed by, a driver circuit 140 of each of one or more light transmitting devices 135 in the venue.

At block 1315, the method 1300 may include modifying a second set of one or more modulation parameters for transmitting an interleaving signal. In some examples, the second set of one or more modulation parameters may differ from the first set of one or more modulation parameters. In some configurations, the interleaving signal may have a constant current. In other configurations, the interleaving signal may include pulses having a fixed frequency. The operation(s) at block 1315 may be performed and/or managed using the illumination and communication management module 520 described with reference to FIGS. 5, 6, 7, and/or 10, the modulation parameter modifier module 545 described with reference to FIGS. 5, 6, and/or 7, and/or the interleaving signal modulation parameter modifier module 710 described with reference to FIG. 7.

In some examples, the second set of one or more modulation parameters may be modified based at least in part on the identifier, the first set of one or more modulation parameters, the illumination factor, a thermal performance of the light source 145, an acoustic performance of the light source 145, and/or a flicker performance of the light source 145. For example, the second set of one or more modulation parameters may be modified to match an average light intensity level of a transmitted instance of the interleaving signal to an average light intensity level of a transmitted instance of the identifier (e.g., to reduce flicker of the light source 145).

Further examples of the modification(s) performed at block 1315 are described with reference to FIGS. 4A and 4B.

In some examples of the method 1300, modifying the second set of one or more modulation parameters may include accessing an electronically stored database that associates sets of modulation parameters for transmitting interleaving signals with sets of modulation parameters for transmitting identifiers. Upon modifying the first set of one or more modulation parameters at block 1310, an index associated with the first set of one or more modulation parameters may be used to retrieve, from the same or different database used to retrieve the first set of one or more modulation parameters, the second set of one or more modulation parameters for transmitting the interleaving signal. In some cases, the database may associate the index with at least two different sets of one or more modulation parameters. A particular one of the sets may be chosen at random or based on one or more other factors (e.g., based on the identifier, the first set of one or more modulation parameters, the illumination factor, the thermal performance of the light source 145, the acoustic performance of the light source 145, and/or the flicker performance of the light source 145).

At block 1320, the method 1300 may include applying at least one signal in which the identifier is encoded to the light source 145, and alternately applying the at least one signal to the light source 145 in accordance with the first set of one or more modulation parameters or the second set of one or more modulation parameters. The at least one signal may in some cases include a current signal and/or a voltage signal and may modulate a light intensity of the light source 145 to transmit a plurality of instances of the identifier interspersed with a plurality of instances of the interleaving signal. In some examples, an instance of the identifier may be encoded in the at least one signal as a sequence of symbols. In some cases, the sequence of symbols may be based at least in part on a frequency shift keying. The operation(s) at block 1320 may be performed and/or managed using the illumination and communication management module 520 described with reference to FIGS. 5, 6, 7, and/or 10, the VLC transmission management module 550 described with reference to FIGS. 5, 6, and/or 7, and/or the identifier transmission management module 715 and/or interleaving signal transmission management module 720 described with reference to FIG. 7.

Therefore, the method 1300 may be used for wireless communication. It should be noted that the method 1300 is just one implementation and that the operations of the method 1300 may be rearranged or otherwise modified such that other implementations are possible.

In some examples, aspects of the methods 1200 and 1300 described with reference to FIGS. 12 and 13 may be combined.

Figure 14:
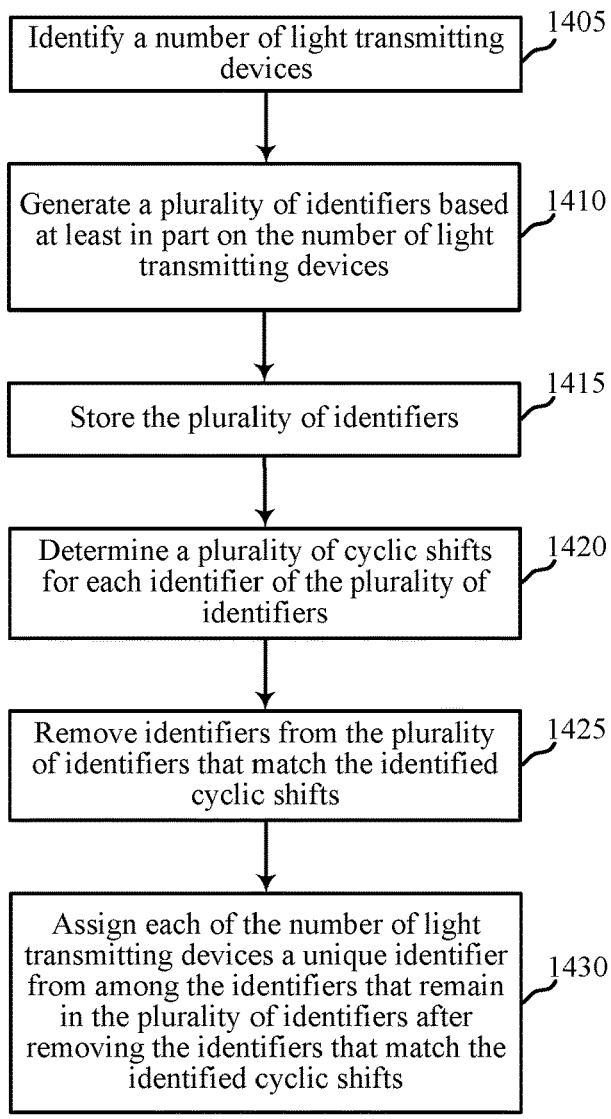
FIG. 14 is a flow chart illustrating a method for generating an identifier (e.g., an identifier of a light transmitting device) to transmit using VLC, in accordance with various aspects of the present disclosure.

FIG. 14 is a flow chart illustrating a method 1400 for generating an identifier (e.g., an identifier of a light transmitting device 135) to transmit using VLC. For clarity, the method 1400 is described below with reference to aspects of one or more of the controllers 105 and/or 805 described with reference to FIGS. 1, 8, and/or 11. In some examples, the VLC management module 820 described with reference to FIGS. 8 and/or 11 may execute one or more sets of codes to control the functional elements of a controller 105, 805 to perform the functions described below.

At block 1405, the method 1400 may include identifying a number of light transmitting devices 135. The identifiers may in some cases include sequences of symbols, which symbols may each represent one or more bits, and which symbols may be based on a frequency shift keying. At block 1410, the method 1400 may include generating a plurality of identifiers based at least in part on the number of light transmitting devices 135. The operation(s) at block 1410 may be performed and/or managed using the processor 810 and/or 1110 described with reference to FIGS. 8 and/or 11, and/or the identifier generator module 845 described with reference to FIG. 8.

In some examples of the method 1400, generating the plurality of identifiers may include selecting an identifier length and an alphabet for generating the plurality of identifiers. The identifier length and alphabet may be selected based at least in part on a number of characters in the alphabet and the identified number of light transmitting devices 135. The plurality of identifiers may be generated as different combinations of alphabet characters having the identifier length. In some cases, the identifier length, N, and alphabet size, N_s, may be selected such that a plurality of identifiers equal to or greater than the number, K, of light transmitting devices 135 in the plurality of light transmitting devices 135 is expected (or ensured) to remain following the identifier removal operation(s) performed at block 1430 (e.g., such that $N\_s^N > K$).

At block 1415, the method 1400 may include storing the generated identifiers. The operation(s) at block 1415 may be performed and/or managed using the memory 802 and/or 1120 described with reference to FIGS. 8 and/or 11, and/or the identifier storage module 850 of the memory 802 described with reference to FIG. 8.

At block 1420, the method 1400 may include identifying a plurality of cyclic shifts for each identifier of the plurality of identifiers. The operation(s) at block 1420 may be performed and/or managed using the processor 810 and/or 1110 described with reference to FIGS. 8 and/or 11, in conjunction with the cyclic shift identifier module 855 of the memory 802 described with reference to FIG. 8.

At block 1425, the method 1400 may include removing identifiers from the plurality of identifiers that match the identified cyclic shifts. The operation(s) at block 1425 may be performed and/or managed using the processor 810 and/or 1110 described with reference to FIGS. 8 and/or 11, in conjunction with the identifier removal module 860 of the memory 802 described with reference to FIG. 8.

At block 1430 the method 1400 may include assigning each of the number of light transmitting devices 135 a unique identifier from among the identifiers that remain in the plurality of identifiers after removing the identifiers that match the identified cyclic shifts. In some cases, assigning a light transmitting device 135 a unique identifier may include transmitting the unique identifier to the light transmitting device 135. In some cases, assigning a light transmitting device 135 a unique identifier may include transmitting an index to the light transmitting device 135. The index may indicate which of a plurality of identifiers stored at the light transmitting device is to be used as the unique identifier of the light transmitting device 135. The operation(s) at block 1430 may be performed and/or managed using the processor 810 and/or 1110 described with reference to FIGS. 8 and/or 11, in conjunction with the identifier assignment module 865 of the memory 802 described with reference to FIG. 8.

The removal of identifiers that are cyclic shifts of other identifiers can speed the rate at which an identifier received at a mobile device 115 and/or other device by means of a VLC transmission is decoded. For example, when an identifier is received at the mobile device 115 and/or other device using a rolling shutter image sensor, a large number of symbol and/or bit erasures may occur. That is, the mobile device 115 and/or other device may only receive some of the symbols and/or bits of an identifier. When the mobile device 115 and/or other device does not receive a number of synchronization symbols and/or bits, the mobile device 115 and/or other device may be unable to determine whether it has received symbols and/or bits of one instance or multiple instances of an identifier (e.g., a last part of a first instance of the identifier followed by a first part of a second instance of the identifier). By removing cyclic shifts of identifiers from a list of identifiers, a received set of symbols and/or bits will match fewer identifiers in the list. If a sufficient number of symbols and/or bits is received by the mobile device 115 and/or other device, the received set of symbols and/or bits may match only one identifier in the list.

Therefore, the method 1400 may be used for wireless communication. It should be noted that the method 1400 is just one implementation and that the operations of the method 1400 may be rearranged or otherwise modified such that other implementations are possible.

Figure 15:
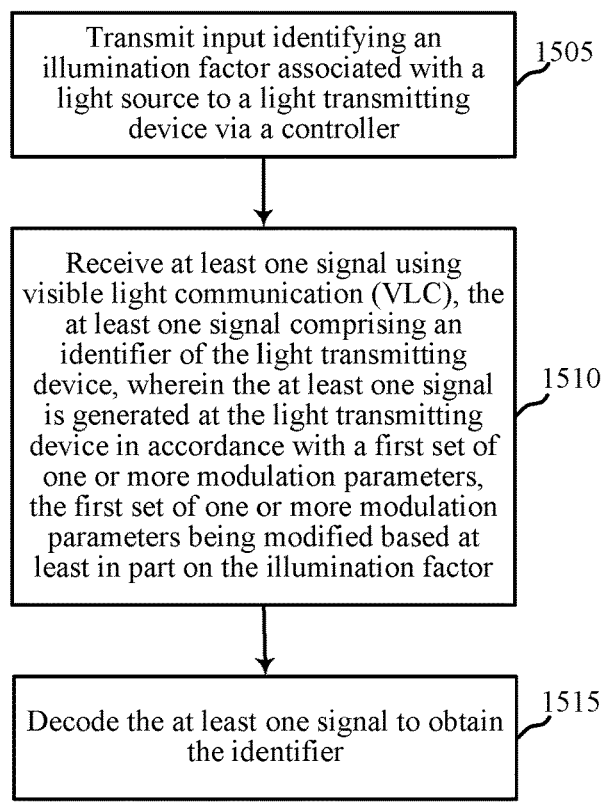
FIG. 15 is a flow chart illustrating a method for wireless communication using VLC, in accordance with various aspects of the present disclosure.

FIG. 15 is a flow chart illustrating a method 1500 for receiving an identifier (e.g., an identifier of a light transmitting device 135) using VLC, in accordance with various aspects of the present disclosure. For clarity, the method 1500 is described below with reference to aspects of one or more of the mobile devices 115 described with reference to FIGS. 1, 2, and/or 9. In some examples, the general purpose processor 910 and/or the DSP 920 described with reference to FIG. 9 may execute one or more sets of codes stored in memory 905 to control the functional elements of the mobile device 115 to perform the functions described below.

At block 1505, the method 1500 may include transmitting input identifying an illumination factor associated with a light source 145 to a light transmitting device 135 via a controller 105. The light source 145 may in some cases be or include one or more LEDs. The illumination factor may in some cases include a percentage of dimness. The operation(s) at block 1505 may be performed and/or managed using the transceiver(s) 930 described with reference to FIG. 9, the VLC management block 1720 and/or the illumination factor identification block 1740 described with reference to FIG. 17.

At block 1510, the method 1500 may include receiving at least one signal using VLC, the at least one signal comprising an identifier of the light transmitting device and the at least one signal being generated at the light transmitting device in accordance with a first set of one or more modulation parameters. The first set of one or more modulation parameters may be modified based at least in part on the illumination factor. The operation(s) at block 1510 may be performed and/or managed using the image sensor 950 described with reference to FIG. 9 and/or the sensor/camera block 1770 in conjunction with transceiver(s) 930 described with reference to FIGS. 9 and/or 17, and/or the transceiver(s) described with reference to FIG. 10.

In some examples of the method 1500, receiving at least one signal may include receiving an interleaving signal, where a plurality of instances of the identifier may be interspersed with a plurality of instances of the interleaving signal, and the at least one signal may be alternately applied to the light source in accordance with the first set of one or more modulation parameters or a second set of one or more modulation parameters. The second set of one or more modulation parameters differs from the first set of one or more modulation parameters. In some examples, the second set of one or more modulation parameters is modified based at least in part on a thermal performance of the light source. In some examples, the second set of one or more modulation parameters may be modified to match an average light intensity level of a transmitted instance of the interleaving signal to an average light intensity level of a transmitted instance of the identifier. The interleaving signal may be a constant current or pulses having a fixed frequency.

At block 1515, the method 1500 may include decoding the at least one signal to obtain the identifier. The operation(s) at block 1515 may be performed and/or managed using the processor 910 and/or 920 described with reference to FIG. 9, the signal decoder block 1750 and/or the identifier decoder block 1752 described with reference to FIG. 17.

Therefore, the method 1500 may be used for wireless communication. It should be noted that the method 1500 is just one implementation and that the operations of the method 1500 may be rearranged or otherwise modified such that other implementations are possible.

Figure 16:
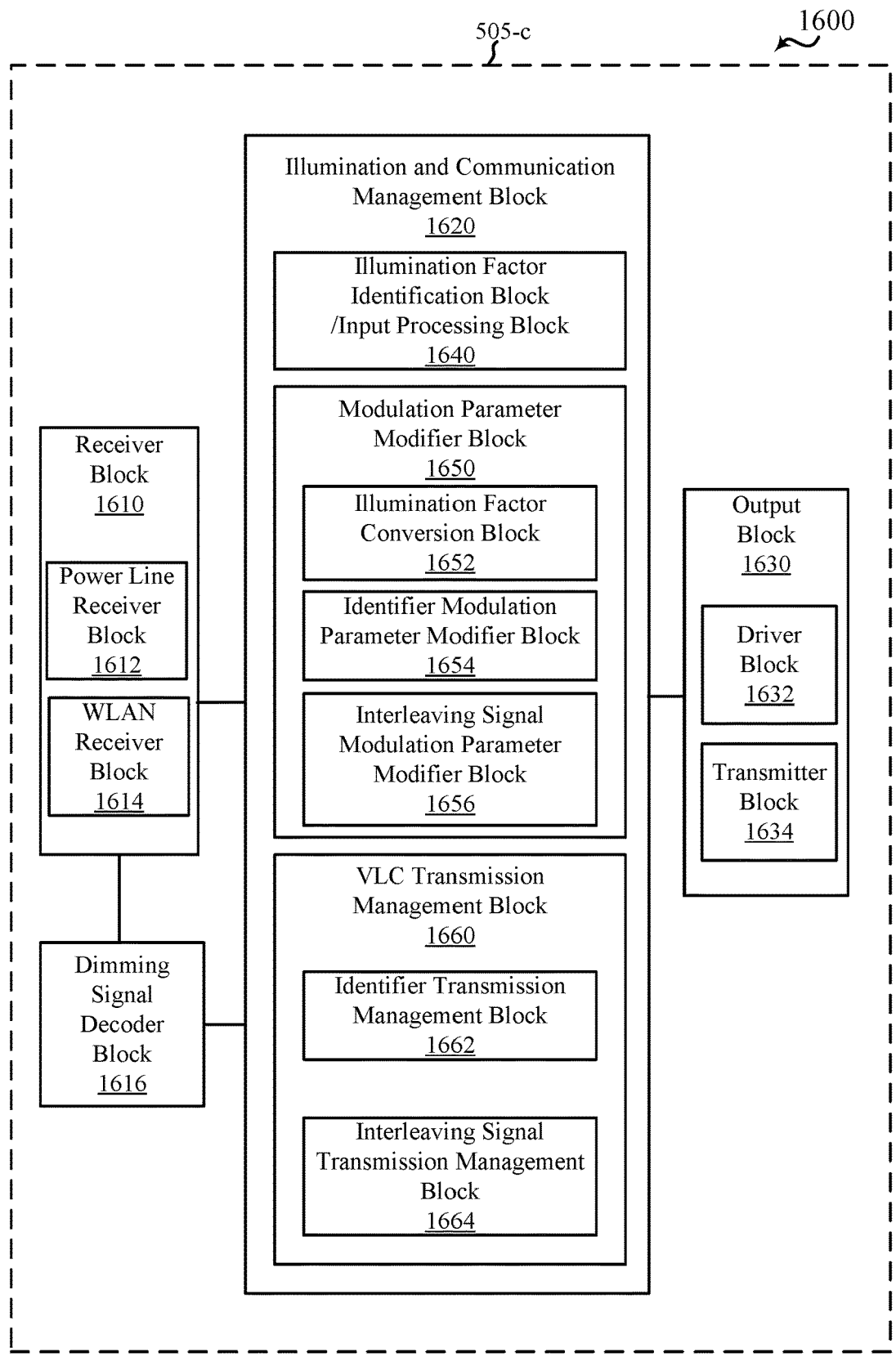
FIG. 16 shows a schematic diagram of a light transmitting device in which examples of components are represented by functionality blocks, in accordance with various aspects of the present disclosure.

FIG. 16 shows a diagram 1600 of a light transmitting device 505-*c* in which examples of modules and components are represented by functionality blocks, in accordance with various aspects of present disclosure. Each of the functionality blocks may be used to perform various functions of light transmitting devices 135 and/or light transmitting device 505 described with reference to FIGS. 1, 2, 5, 6, 7, and/or 10. The light transmitting device 505-*c* may include an illumination and communication management block 1620, a receiver block 1610, and an output block 1630. The illumination and communication management block 1620 may include an illumination identification block/input processing block 1640, a modulation parameter modifier block 1650, and a VLC transmission management block 1660. Each of these blocks may be in communication with each other and may perform the functions of the corresponding modules described in FIGS. 5, 6, 7, and/or 10. The illumination identification block/input processing block 1640 may perform the functions of the illumination factor identification module 540 or the input processing module 605 described with reference to FIG. 5, 6, or 7. The modulation parameter modifier block 1650 may include a illumination conversion block 1652, an identifier modulation parameter modifier block 1654, and an interleaving signal modulation parameter modifier block 1656. The modulation parameter modifier block 1650 may perform the functions of the modulation parameter modifier module 545 described with reference to FIG. 5, 6, or 7. The illumination conversion block 1652 may perform the functions of the illumination factor conversion module 610 described with reference to FIG. 6, the identifier modulation parameter modifier block 1654 may perform the functions of the identifier modulation parameter modifier module 705 described with reference to FIG. 7, and the interleaving signal modulation parameter modifier block 1656 may perform the functions of the interleaving signal modulation parameter modifier module 710 described with reference to FIG. 7.

The VLC transmission management block 1660 may include an identifier transmission management block 1662 and an interleaving signal transmission management block 1664. The VLC transmission management block 1660 may perform the functions of the VLC transmission management module 550 described with reference to FIG. 5, 6, or 7. The identifier transmission management block 1662 and the interleaving signal transmission management block 1664 may each perform the functions of the identifier transmission management module 715 and the interleaving signal transmission management module 720 described with reference to FIG. 7.

The receiver block 1610 may include a power line receiver block 1612, which may perform functions related to transmissions via the power line interface described with reference to FIG. 5, 6, or 7 and the WLAN receiver block 1614, which may perform functions related to transmissions via the WLAN interface described with reference to FIG. 5, 6, or 7. The dimming signal decoder block 1616 may perform the functions of the dimming signal decoder module 516 described with reference to FIG. 5, 6, or 7. The driver block 1632 may perform the functions of the driver module 532 described with reference to FIG. 5, 6, or 7 and the transmitter block 1634 may perform the functions of the power line interface 512, the WLAN interface described with reference to FIG. 5, 6, or 7. The driver block 1632 and the transmitter block 1634 may be referred to as the output block 1630 in some example.

Figure 17:
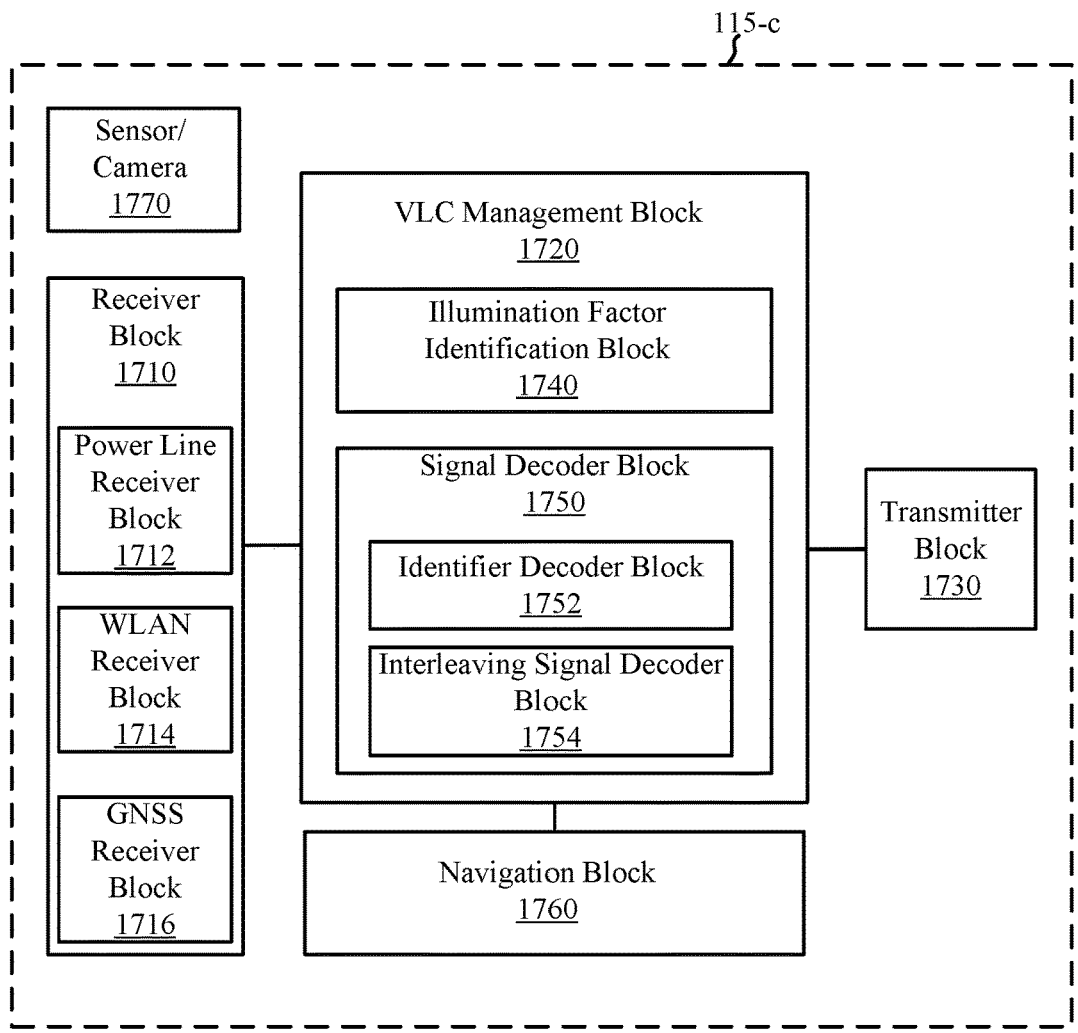
FIG. 17 shows a schematic diagram of a mobile device in which examples of components are represented by functionality blocks, in accordance with various aspects of the present disclosure.

FIG. 17 shows a diagram 1700 of a mobile device 115-c in which examples of modules and components are represented by functionality blocks, in accordance with various aspects of present disclosure. Each of the functionality blocks may be used to perform various functions of mobile devices 115 described with reference to FIGS. 1, 2, and/or 9. The mobile device 115-c may include a VLC management block 1720, a receiver block 1710, and a transmitter block 1730. The VLC management block 1720 may include an illumination factor identification block 1740, a signal decoder block 1750, and a navigation block 1760. Each of these blocks may be in communication with each other and performs functions related to the mobile device 115 described in FIGS. 1, 2, and/or 9.

The illumination factor identification block 1740 may be used to identify an illumination factor associated with a light source 145 to be provided to light transmitting devices 135 of FIG. 1 and/or FIG. 2. The light source 145 may in some cases be or include one or more LEDs. The illumination factor may in some cases include a percentage of dimness.

The signal decoder block 1750 may be used to decode one or more signals received using VLC. The signal may be an identifier of the light transmitting device. In some examples, the mobile device 115-c may receive at least one signal comprising the identifier and the identifier decoder block 1752 of the mobile device 115-c may be used to decode the at least one signal to obtain the identifier. In other examples, the mobile device 115-c may receive an interleaving signal, where a plurality of instances of the identifier is interspersed with a plurality of instances of the interleaving signal. In these cases, the interleaving signal decoder block 1754 may be used to decode the interleaving signal to obtain the identifier.

The sensor/camera block 1770 may in some cases include a CMOS image sensor, and in some cases may be configured as a rolling shutter image sensor. The sensor/camera block 1770 may be used to capture images of light transmitting devices 135 and/or VLC transmissions from light transmitting devices 135.

The navigation block 1760 may be used to implement a navigation function based on VLC transmissions received from a number of light transmitting devices 135. Each of the VLC transmissions may include an identifier of a light transmitting device 135. The identifier(s) may be used by the navigation block 1760 to determine a location of each light transmitting device 135 for which an identifier is received. Based at least in part on the locations of one or more light transmitting devices 135 with respect to the mobile device 115-c, the navigation block 1760 may determine a location and/or orientation of the mobile device 115-c. By way of example, the navigation block 1760 may be a component of the mobile device 115-c in communication with some or all of the other components of the mobile device 115-c over one or more buses. Alternatively, functionality of the navigation block 1760 may be implemented as a computer program product and/or as one or more controller elements of the processor such as the processors 910, 920 described with reference to FIG. 9.

The receiver block 1710 may include a power line receiver block 1712, a WLAN receiver block 1714, and a GNSS receiver block 1716. The GNSS receiver block 1716 may perform the functions of GNSS receiver 970 described with reference to FIG. 9. The transmitter block 1730 may be combined with the receiver block 1710 as one or more transceivers in one embodiment.

Figure 18:
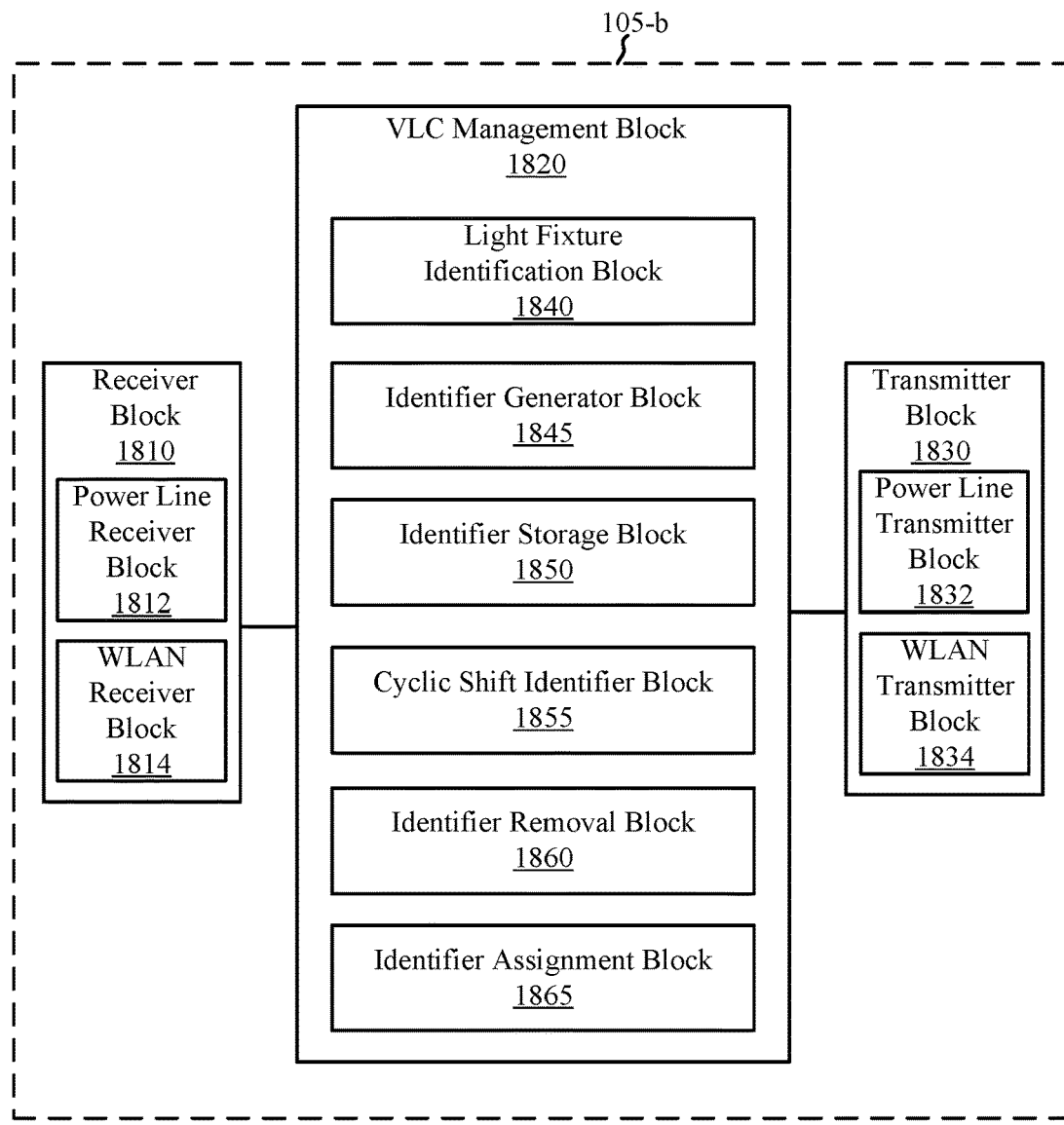
FIG. 18 shows a schematic diagram of a controller in which examples of components are represented by functionality blocks, in accordance with various aspects of the present disclosure.

FIG. 18 shows a diagram 1800 of a controller 105-b in which examples of modules and components are represented by functionality blocks, in accordance with various aspects of present disclosure. Each of the functionality blocks may be used to perform various functions of controllers 105, 805 described with reference to FIGS. 1, 2, 8, and/or 11. The controller 105-b may include a VLC management block 1820, a receiver block 1810, and a transmitter block 1830. The VLC management block 1820 may include a light transmitting device identification block 1840, an identifier generator block 1845, an identifier storage block 1850, a cyclic shift identifier block 1855, an identifier removal block 1860, and/or an identifier assignment block 1865. Each of these components may be in communication with each other and performs corresponding modules described in FIG. 8. For example, the light transmitting device identification block 1840 may perform the functions of the light transmitting device identification module 840 described with respect to FIG. 8, the identifier generator block 1845 may perform the functions of the identifier generator module 845 described with respect to FIG. 8, the identifier storage block 1850 may perform the functions of the identifier storage module 850 described with respect to FIG. 8, the cyclic shift identifier block 1855 may perform the functions of the cyclic shift identifier module 855 described with respect to FIG. 8, the identifier removal block 1860 may perform the functions of the identifier removal module 860 described with respect to FIG. 8, and the identifier assignment block 1865 may perform the functions of the identifier assignment module 865 described with respect to FIG. 8. The receiver block 1810 and the transmitter block 1830 may each include a power line block 1812, 1832 and a WLAN block 1814, 1834, and each may perform the functions of the power line interface 812 and the WLAN interface 814 to receive or transmit transmissions via a power line and WLAN.

Techniques described herein may be used to determine the orientations of mobile devices operating in various wireless communication systems, such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may, individually or collectively, be implemented or performed with one or more ASICs adapted to perform some or all of the applicable functions in hardware. Alternatively, the functions may be performed by one or more other processing units (or cores) such as a general-purpose processor or a digital signal processor (DSP), and/or on one or more integrated circuits. A general-purpose processor may be a microprocessor, any conventional processor, controller, microcontroller, state machine, or combination thereof. A processor may also be implemented as a combination of computing devices, e.g., a combination of a DSP and a microprocessor, multiple microprocessors, one or more microprocessors in conjunction with a DSP core, or any other such configuration. In other embodiments, other types of integrated circuits may be used (e.g., Structured/Platform ASICs, FPGAs, and other Semi-Custom ICs), which may be programmed in any manner known in the art. The functions of each of the blocks and modules may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, compact disc (CD)-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

What is claimed is:

1. A method for generating a plurality of identifiers for transmission using visible light communication (VLC), comprising:
    identifying a number of light transmitting devices;
    selecting an identifier length and an alphabet for generating the plurality of identifiers, wherein the alphabet comprises alphabet characters associated with a plurality of symbols, at least two of the symbols having different symbol durations;
    generating the plurality of identifiers based at least in part on the number of light transmitting devices, each of the plurality of identifiers comprising a sequence of symbols selected from the plurality of symbols of the alphabet based at least in part on the identifier length;
    storing the plurality of identifiers;
    determining a plurality of cyclic shifts for each identifier of the plurality of identifiers;
    removing identifiers from the plurality of identifiers that match the plurality of cyclic shifts; and
    assigning each of the number of light transmitting devices a unique identifier from among the identifiers that remain in the plurality of identifiers after removing the identifiers that match the plurality of cyclic shifts.

2. The method of claim 1, wherein generating the plurality of identifiers comprises:
selecting the identifier length and the alphabet based at least in part on a number of alphabet characters and the number of light transmitting devices; and
generating the plurality of identifiers as different combinations of the number of alphabet characters having the identifier length.

3. The method of claim 1, wherein assigning the each of the number of light transmitting devices a unique identifier comprises:
transmitting the unique identifier to a light transmitting device.

4. The method of claim 1, wherein assigning the each of the number of light transmitting devices a unique identifier comprises:
transmitting an index to a light transmitting device, the index indicating which of the plurality of identifiers stored at the light transmitting device is to be used as the unique identifier of the light transmitting device.

5. The method of claim 1, wherein the unique identifier is encoded in at least one signal as a sequence of symbols.

6. The method of claim 5, wherein the sequence of symbols is based at least in part on a frequency shift keying.

7. The method of claim 1, wherein the alphabet characters are associated with corresponding combinations of symbol durations and pulse durations of respective symbols.

8. A controller for generating a plurality of identifiers for transmission using visible light communication (VLC), comprising:
means for identifying a number of light transmitting devices;
means for selecting an identifier length and an alphabet for generating the plurality of identifiers, wherein the alphabet comprises alphabet characters associated with a plurality of symbols, at least two of the symbols having different symbol durations;
means for generating the plurality of identifiers based at least in part on the number of light transmitting devices, each of the plurality of identifiers comprising a sequence of symbols selected from the plurality of symbols of the alphabet based at least in part on the identifier length;
means for storing the plurality of identifiers;
means for determining a plurality of cyclic shifts for each identifier of the plurality of identifiers;
means for removing identifiers from the plurality of identifiers that match the plurality of cyclic shifts; and
means for assigning each of the number of light transmitting devices a unique identifier from among the identifiers that remain in the plurality of identifiers after removing the identifiers that match the plurality of cyclic shifts.

9. The controller of claim 8, wherein the means for generating the plurality of identifiers comprises:
means for selecting the identifier length and the alphabet based at least in part on a number of alphabet characters and the number of light transmitting devices; and
means for generating the plurality of identifiers as different combinations of the number of alphabet characters having the identifier length.

10. The controller of claim 8, wherein the means for assigning each of the number of light transmitting devices a unique identifier comprises:
means for transmitting the unique identifier to a light transmitting device.

11. The controller of claim 8, wherein the means for assigning each of the number of light transmitting devices a unique identifier comprises:
means for transmitting an index to a light transmitting device, the index indicating which of the plurality of identifiers stored at the light transmitting device is to be used as the unique identifier of the light transmitting device.

12. The controller of claim 8, wherein the unique identifier is encoded in at least one signal as a sequence of symbols.

13. The controller of claim 12, wherein the sequence of symbols is based at least in part on a frequency shift keying.

14. A controller for generating a plurality of identifiers for transmission using visible light communication (VLC), comprising:
a processor configured to:
identify a number of light transmitting devices;
select an identifier length and an alphabet for generating the plurality of identifiers, wherein the alphabet comprises alphabet characters associated with a plurality of symbols, at least two of the symbols having different symbol durations; and
generate the plurality of identifiers based at least in part on the number of light transmitting devices, each of the plurality of identifiers comprising a sequence of symbols selected from the plurality of symbols of the alphabet based at least in part on the identifier length;
memory configured to store the plurality of identifiers;
wherein the processor is further configured to:
determine a plurality of cyclic shifts for each identifier of the plurality of identifiers;
remove identifiers from the plurality of identifiers that match the plurality of cyclic shifts; and
assign each of the number of light transmitting devices a unique identifier from among the identifiers that remain in the plurality of identifiers after removing the identifiers that match the plurality of cyclic shifts; and
a transmitter configured to transmit information based at least in part on the plurality of identifiers.

15. The controller of claim 14, wherein the processor configured to generate the plurality of identifiers comprises a processor configured to:
select the identifier length and the alphabet based at least in part on a number of alphabet characters and the number of light transmitting devices; and
generate the plurality of identifiers as different combinations of the number of alphabet characters having the identifier length.

16. The controller of claim 14, wherein transmitter configured to transmit the information comprises a transmitter configured to:
transmit the unique identifier to a light transmitting device.

17. The controller of claim 14, wherein transmitter configured to transmit the information comprises a transmitter configured to:
transmit an index to a light transmitting device, the index indicating which of the plurality of identifiers stored at the light transmitting device is to be used as the unique identifier of the light transmitting device.

18. The controller of claim 14, wherein the unique identifier is encoded in at least one signal as a sequence of symbols.

\* \* \* \* \*